United States Patent
Strohn et al.

(10) Patent No.: US 6,374,575 B1
(45) Date of Patent: Apr. 23, 2002

(54) BOTTLING PLANT AND METHOD OF OPERATING A BOTTLING PLANT

(75) Inventors: Gisbert Strohn, Herdecke; Ulrich Wiedemann, Dortmund; Bernd Molitor, Worms; Falk Dittrich, Essen, all of (DE)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 0 days.

(21) Appl. No.: 09/510,862

(22) Filed: Feb. 23, 2000

(30) Foreign Application Priority Data

Feb. 24, 1999 (DE) .......................................... 199 08 035

(51) Int. Cl.⁷ ................................................ B67B 7/28
(52) U.S. Cl. ......................... 53/288; 53/48.7; 53/426; 426/407; 422/3; 422/38; 422/62
(58) Field of Search ........................ 53/127, 426, 425, 53/428, 48.7, 288; 426/407, 401; 99/487, 470, 275; 422/3, 38, 62, 302, 304

(56) References Cited

U.S. PATENT DOCUMENTS

| 4,441,406 A | * | 4/1984 | Becker et al. ................. 99/275 |
| 4,457,892 A | * | 7/1984 | Young ............................. 422/3 |
| 4,773,321 A | * | 9/1988 | Wijts ............................. 99/470 |
| 4,797,255 A | * | 1/1989 | Hatanaka et al. ........... 422/304 |
| 5,012,727 A | * | 5/1991 | Pesente ........................ 99/470 |
| 5,152,968 A | * | 10/1992 | Foti et al. ...................... 53/425 |
| 5,178,841 A | * | 1/1993 | Vokins et al. ................. 53/425 |
| 5,896,727 A | * | 4/1999 | Egli et al. ...................... 53/426 |
| 6,135,015 A | * | 10/2000 | Mendez ....................... 426/406 |
| 6,142,065 A | * | 11/2000 | Panella et al. ................ 99/470 |

* cited by examiner

Primary Examiner—Rinaldi I. Rada
Assistant Examiner—Sameh Tawfik
(74) Attorney, Agent, or Firm—Nils H. Ljungman & Associates

(57) ABSTRACT

A method and an apparatus therefor for stabilizing products in containers in a continuous container flow by stationary, sequential sections by means of overflowing liquid, whereby the sections are graduated with respect to one another in terms of their liquid temperature, and for purposes of efficient liquid recycling are organized in pairs, so that the liquid is transported by overflow among sections, and to set the desired temperature of the overflowing liquid, liquid is added to the liquid being transported, characterized by the fact that the excess liquid in the at least one zone overflows in a cascade fashion from zone to zone of increasing overflow temperature and into liquid reservoirs.

6 Claims, 28 Drawing Sheets

BOTTLING PLANT AND METHOD OF OPERATING A BOTTLING PLANT

BACKGROUND OF THE INVENTION

1. Field of the Invention

The present invention relates to a bottling plant with sections for stabilizing bottled products in containers.

2. Background Information

In the beverage industry, in particular when products being bottled are easily perishable, it is common practice to heat-stabilize the products. In bottling plants of the known art, the containers that contain the products are transported in a practically uniform movement from the entry of the plant to the exit from the plant. As they move through the plant, they are heated until they have achieved the required degree of heat-stabilization and are then cooled, whereupon the heat-stabilizing process is completed. A heat-stabilizing tunnel provided for this purpose consequently has a heating section, a superheating and heat-stabilizing section, and a final cooling section. The individual sections can have additional sub-zones. The gradual heating and cooling that such an arrangement provides is preferred, in particular for the glass bottles used in the beverage industry, to prevent any destruction of the glass bottles caused by abrupt temperature changes. The transmission of heat to the product in the containers normally occurs by spraying these containers with water as they are advanced on a conveyor belt which allows the liquid to be sprayed from underneath. Underneath the conveyor belt are catch basins for the sprayed liquid from which the pumps for the spraying are fed. Heat can be exchanged by means of the spray liquid zone-wise between the zones to be heated and the zones to be cooled.

In at least one possible embodiment of the present invention, the containers to be heat-stabilized and the heat-stabilized containers preferably are bottles.

To achieve an optimal graduation of the temperatures in the individual sections, the sections are subdivided into individual zones. Generally, the heating section has three to four individual zones, the heat-stabilizing section has two or three zones, and there can be an additional superheating zone upstream of the heat-stabilizing zone. The following cooling section in turn has three to four individual zones, in which the containers are cooled by reducing the temperature of the spraying liquid in steps until the containers reach the desired output temperature.

To guarantee that the product in the containers achieves the specified degree of heat-stabilization, the individual spraying temperatures set must be adapted to the following factors, for example: the product, the length of the zones, and the speed of the conveyor belt.

Because such a heat-stabilization system is installed as part of a more comprehensive bottling plant and represents only a portion of this bottling plant, disruptions in the continuous feed of the containers, i.e., an interruption in the flow of containers, or disruptions in the removal of the containers, i.e., a production stoppage, can occur more or less frequently. The result of a production stoppage is that the taste of the products that are currently being held at the heat stabilization temperature can be adversely affected by excessive heat stabilization.

If there is an interruption in the container flow or if the plant runs empty, the thermal equilibrium between the products being heated and the products being cooled is disrupted so that initially the products leave the plant at an excessive temperature, later the heat-stabilized products are no longer cooled quickly enough, and finally the products that enter the heat-stabilizing section are no longer at the required heat stabilization temperature.

In other words, in known heat stabilizing systems, if there is an interruption in the container flow or if the heat stabilization or bottling plant runs empty, the thermal equilibrium between the products being heated and the products being cooled may be disrupted. As a result of such disruption, containers that enter the heat stabilizing section may not be at the required pasteurization temperature. These containers may not be cooled quickly enough after heat stabilization and therefore may leave the plant at an excessive temperature.

The consequences of the type of production disruption described above can be prevented by the controlled addition or removal of thermal energy. Generally, either heat is added to the process indirectly by means of heat exchangers or hot water is added directly from a central heat source and returned at a colder temperature. The removal of heat from the process is realized, as in the known art, by the addition of cold liquid, which is then removed at a higher temperature.

OBJECT OF THE INVENTION

One object of the present invention may be to propose a method for the operation of such a bottling plant in which the response to disruptions in the container flow can be managed in an essentially optimum fashion with an essentially minimized utilization of the resources water and heat.

SUMMARY OF THE INVENTION

One characteristic of the process may be that each addition of heat required for regulation of the process may be followed after some delay by the removal of heat (and vice versa) on the same order of magnitude. In this regard, the teachings concerning the storage of the heat are described in some publications.

One disadvantage of the methods described in some publications, however, is that as a result of the collection of the liquid overflowing from the plant in a conduit or in a plurality of reservoirs, a mixing of the temperatures takes place so that the resulting temperature of the fluid in the reservoir cannot be used either for controlled cooling or for controlled heating. An additional disadvantage is that although heat is stored on a low temperature level, the liquid in question cannot be used for cooling, i.e., there is no conservation of water.

At least one possible embodiment of the present invention preferably teaches that to eliminate these disadvantages, the excess liquid in the heating section added by the regulation process to the zones in the method overflows in a cascade fashion from zone to zone of increasing overflow temperature; in the cooling section, overflows in cascade fashion from zone to zone of decreasing overflow temperature; from the last zone, i.e, the hottest zone in the heating section, overflows into an essentially warm liquid reservoir or tank 13; and from the coldest zone, position, or tank 10 in the cooling section, overflows into an essentially cold liquid reservoir or tank 14. Also, to eliminate the disadvantages of the known art, at least one possible embodiment of the present invention preferably teaches that the excess fluid added by the regulation process to the heat stabilizing section overflows from the zones into an essentially hot liquid reservoir 15.

In an independent realization of the invention, the liquid contained in the cold liquid reservoir 14 can be forcibly transported and used in a controlled fashion to cool at least the zones or tanks in the cooling section and in the heat stabilizing section; the liquid contained in the warm liquid reservoir 13 can be forcibly transported and used in a controlled fashion to heat at least the zones or tanks in the heating section or to cool the zones or tanks in the heat-stabilizing section; and the liquid in the hot liquid reservoir, after the addition of thermal energy, can be used in a controlled fashion to heat at least the zones or tanks in the heat stabilizing section.

As a result of the use of at least one possible embodiment of the present invention, the cold water in the initial portion of the heating section may be essentially gradually heated to the respective higher operating temperatures of the subsequent zones, and the water injected into the cooling section is in turn cooled down essentially gradually, as a function of the individual zones, which may lead to a particularly efficient use of energy. Additionally, when there is a disruption in the feed of the containers to be heat-stabilized, the quantity of water currently in the containers can be used for an essentially rapid cooling of the critical zones, as well as for an essentially rapid heating of these zones and the additional zones, as a result of which the consumption of fresh water can be reduced significantly.

In other words, in at least one possible embodiment of the present invention, water or other liquid, even in the event of a stoppage, interruption, or emptying of the bottling plant or heat stabilizing system, preferably is recycled from the cooling section to the heating section, for example, and vice versa. Also, in at least one possible embodiment of the present invention, water or other liquid, even in the event of a stoppage, interruption, or emptying of the bottling plant or heat stabilizing system, is maintained at an essentially constant temperature by means of tanks or reservoirs that may be centrally located in the bottling plant or heat stabilizing system.

The embodiments of the present invention discussed herein will be described further herein with reference to the accompanying figures. When the word "invention" is used in this specification, the word "invention" includes "inventions", that is, the plural of "invention". By stating "invention", Applicants do not in any way admit that the present application does not include more than one patentably and non-obviously distinct invention, and maintain that this application may include more than one patentably and non-obviously distinct invention. Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to at least one exemplary embodiment, which is illustrated in the accompanying drawings as follows.

DESCRIPTION OF THE PREFERRED EMBODIMENT

Figure 1:
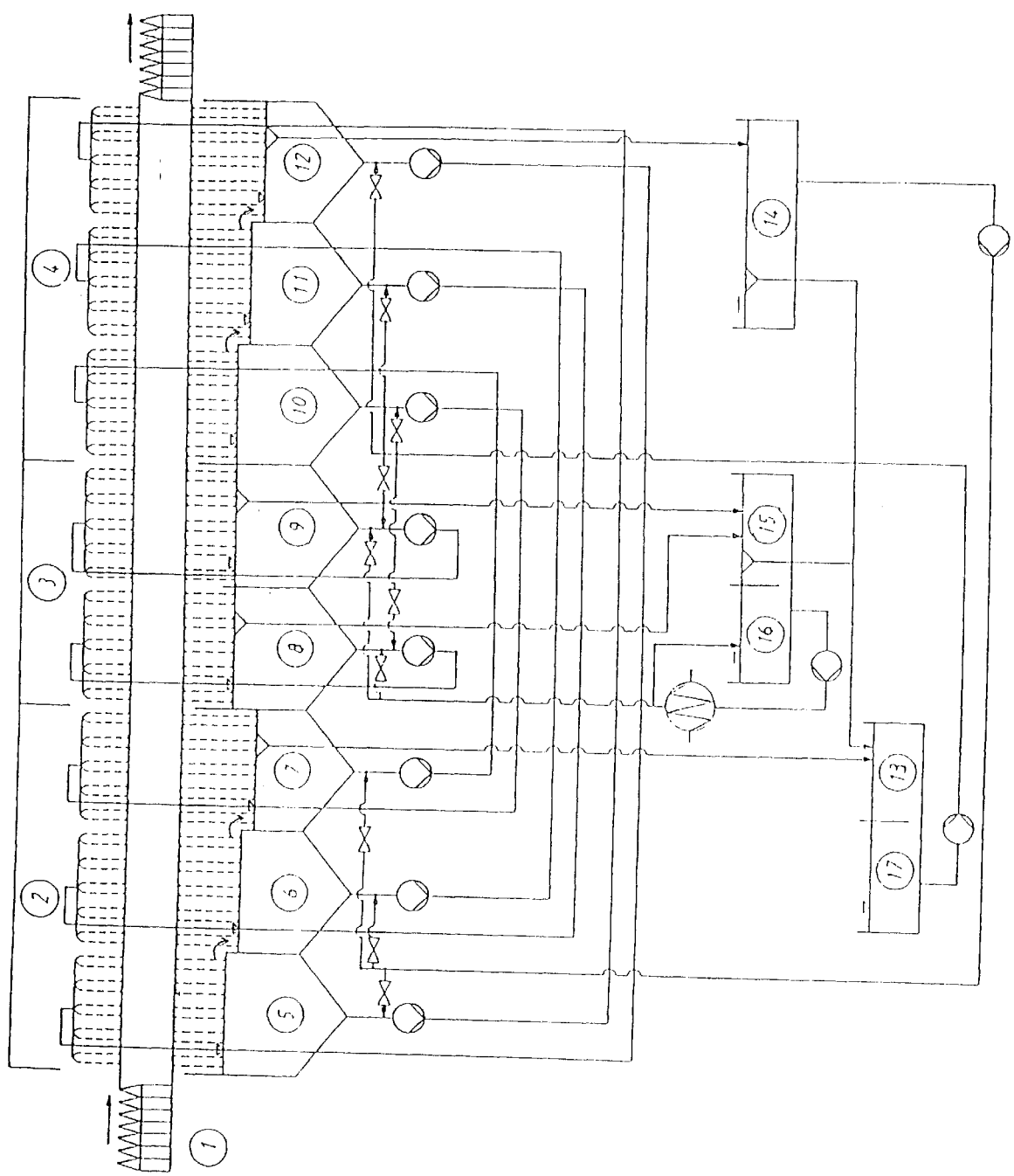
FIG. 1 is a diagram of a heat stabilizing system.
Figure 1A:
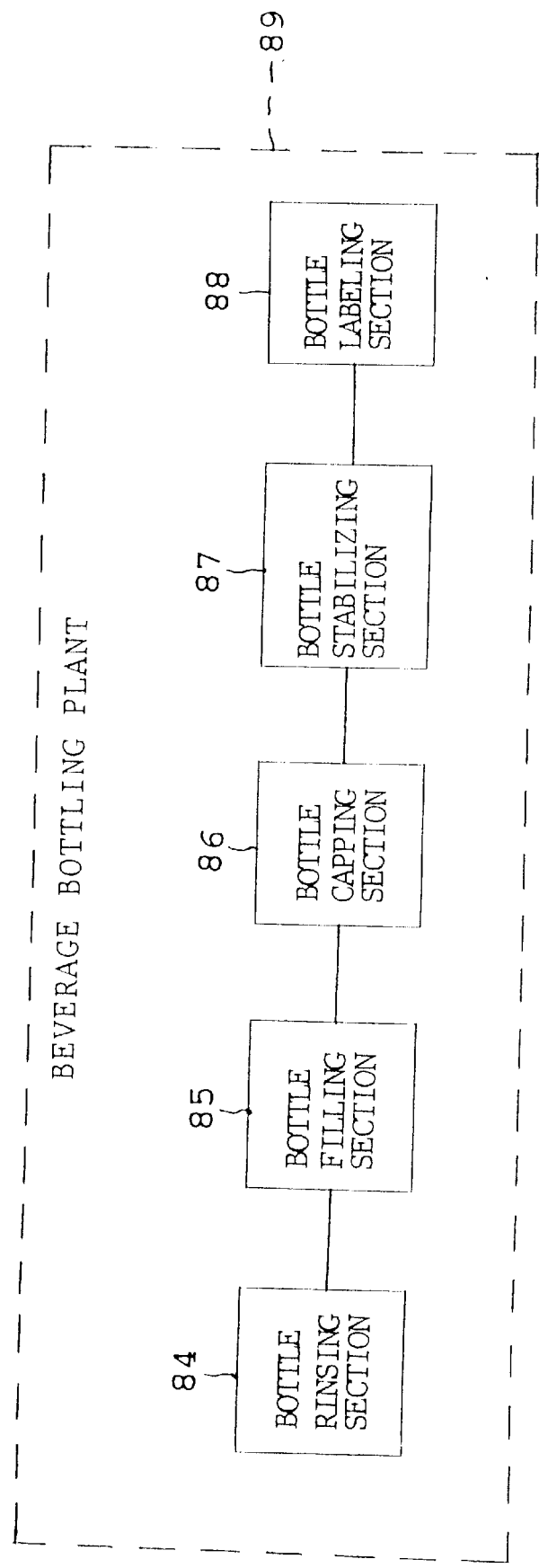
FIG. 1*a* is a block diagram of a beverage bottling plant and its sections.

FIG. 1A is a block diagram of a beverage bottling plant 89 and the sections 84–88 of this plant 89. Bottles or other containers move through the bottling plant 89 in the following order: bottle rinsing section 84; bottle filling section 85; bottle capping section 86; bottle stabilizing section 87; and bottle labeling section 88. In other words, the bottle stabilizing section 87 may be a heat stabilizing section.

As shown in FIGS. 1, 2, 2A, and 19, the bottling or pasteurizing plant consists of a heating section 2 located in the initial portion, determined on the basis of the direction of travel of the respective container or respective bottle or flow of containers or bottles 1, which heating section in turn consists of a plurality of individual zones or tanks 5–7, whereby the heating phase is correspondingly essentially gentle and gradual. As shown in FIGS. 1, 2, 2B, and 19, following this heating section 2 is a superheating zone 8, which is followed in turn by the actual pasteurizing zone or pasteurizing zone or tank 9. Then, as shown in FIGS. 1, 2, 2C, and 19, the cooling section 4 begins which, as with the other sections, can consist of a larger number of individual zones or tanks 10–12.

The operating program of such a pasteurizing plant is initially designed to conduct the pasteurizing operation under essentially optimum conditions. For example, the invention teaches that the first heating zone 5 has a spray temperature of approximately 18 degrees Celsius, for example. The initial temperature of the pasteurized products is accordingly set at a spray temperature of approximately 17 degrees Celsius. The second heating zone 6 has a spray temperature of slightly greater than 24 degrees Celsius, whereby the cooling zone that communicates with it can be at a temperature of somewhat less than 23 degrees Celsius. Using the example of these two zones 5,6, it is apparent that the water from the cooling zones 4 is conducted respectively to the zone 5 in the heating section 2, the desired heating temperature of which comes closest to the desired cooling temperature. To equalize the respective temperature difference, water from the first tank 13, shown in FIGS. 1, 2, 2D, and 19, is essentially advantageously added in small amounts to the water from the cooling section 4, which additional higher-temperature water or other liquid originates from the final station 7 of the heating section 2. Following this heating section 2 is the superheating zone 8, the temperature of which is in turn higher than the temperature of the final heating zone 7. The superheating zone 8 is fed from a second tank 15, shown in FIGS. 1, 2, 2E, and 19, with water or other liquid at a higher temperature than the water in the first tank 13. Associated with the tank 15 is a third tank 16, as shown in FIGS. 1, 2, 2E, and 19, to which the excess water or other liquid from the tank 15 is fed. This tank 16 is also maintained at a specified higher temperature than the water in the tank 13 by means of a heater device or heat exchanger 57, shown in FIGS. 1, 2, 2E, and 19. The water or other liquid in tank 16 is also used to feed the superheating and pasteurizing zones 8, 9, whereby the quantity of hot water or other liquid discharged is collected in the tank 15 and is mixed with the hot water of the tank 16.

Figure 2:
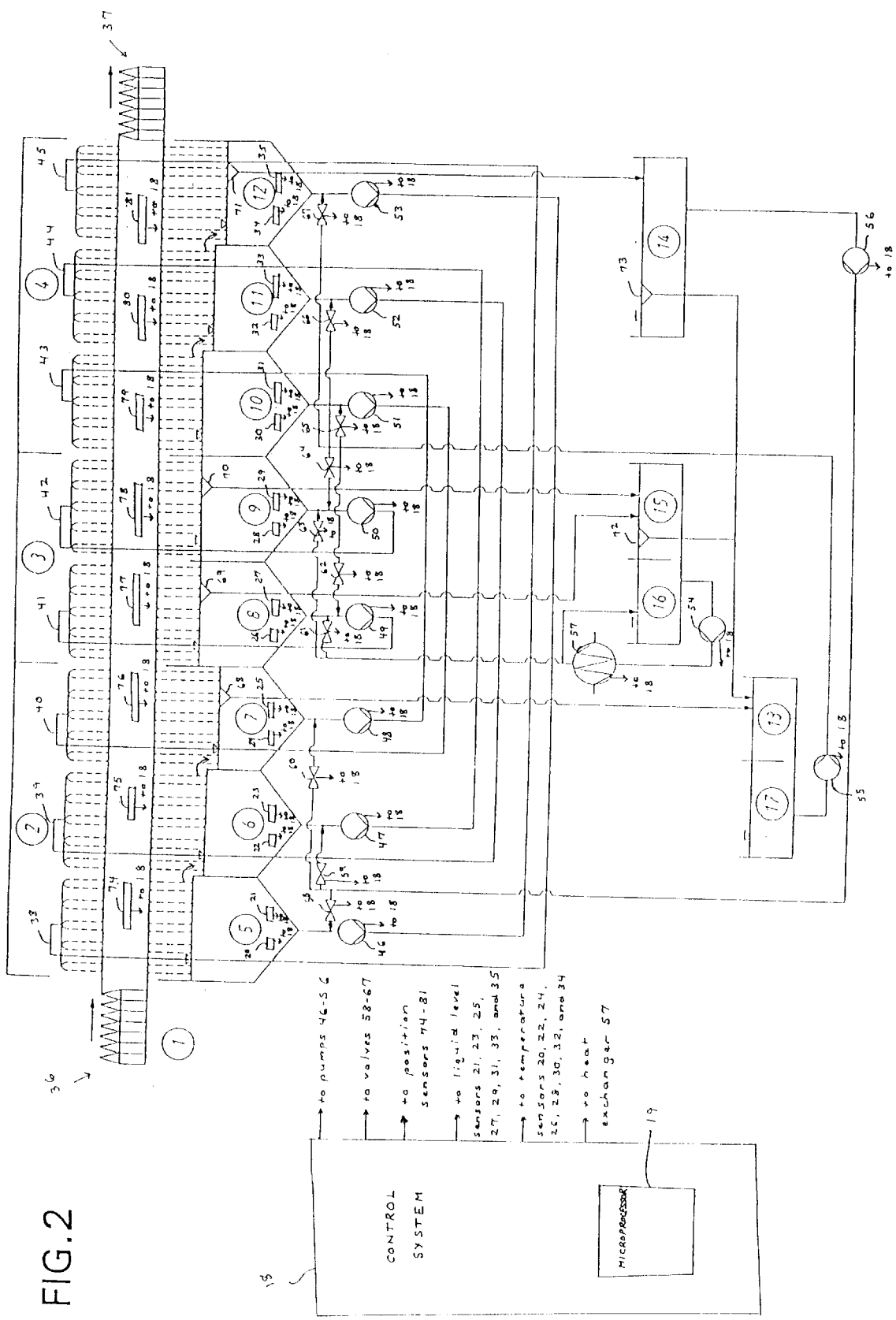
FIG. 2 is an enlarged reproduction of FIG. 1 with additional information.
Figure 2A:
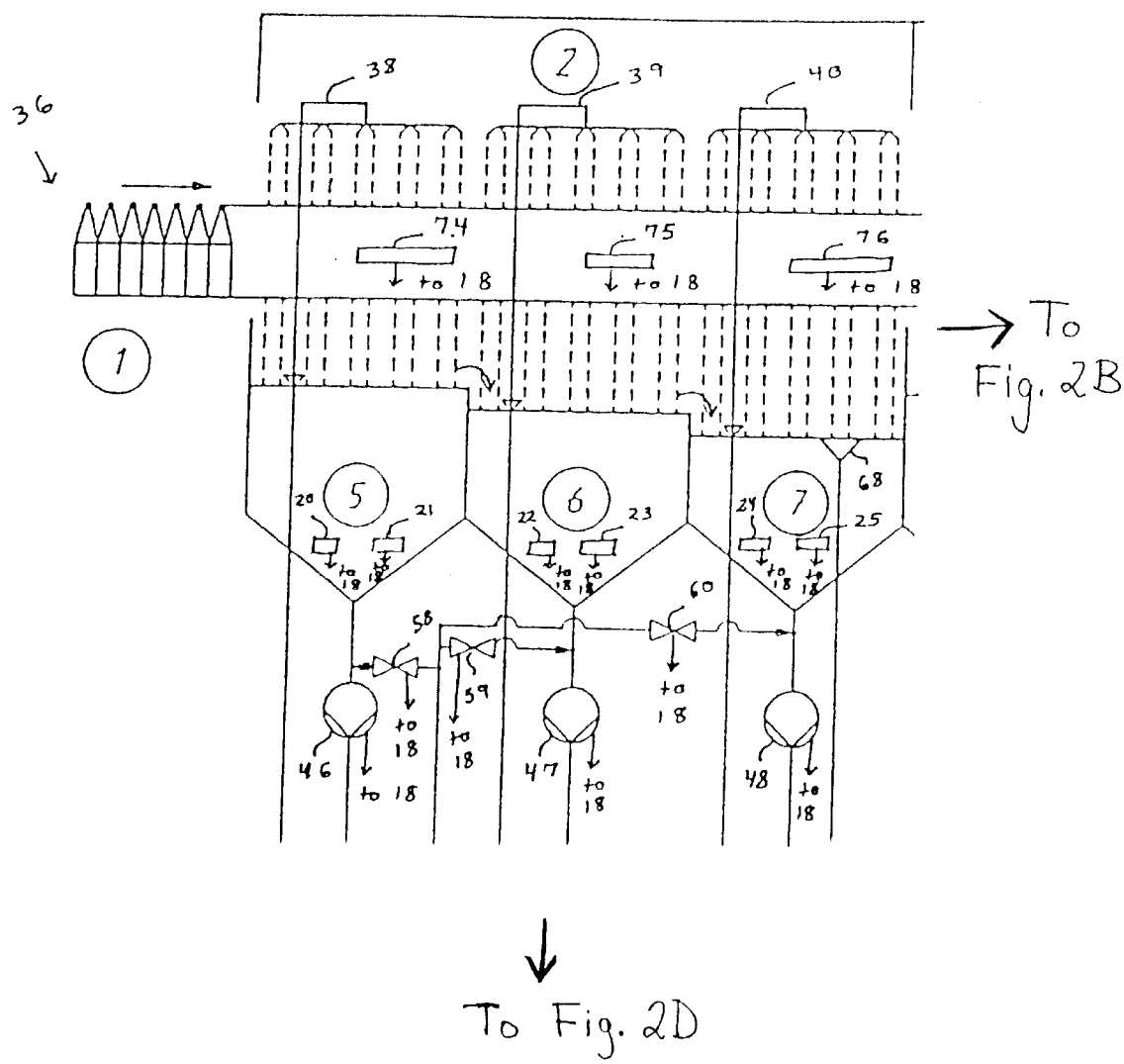
FIGS. 2A, 2B, 2C, 2D, 2E, and 2F are enlarged views of sections of FIG. 2.
Figure 2B:
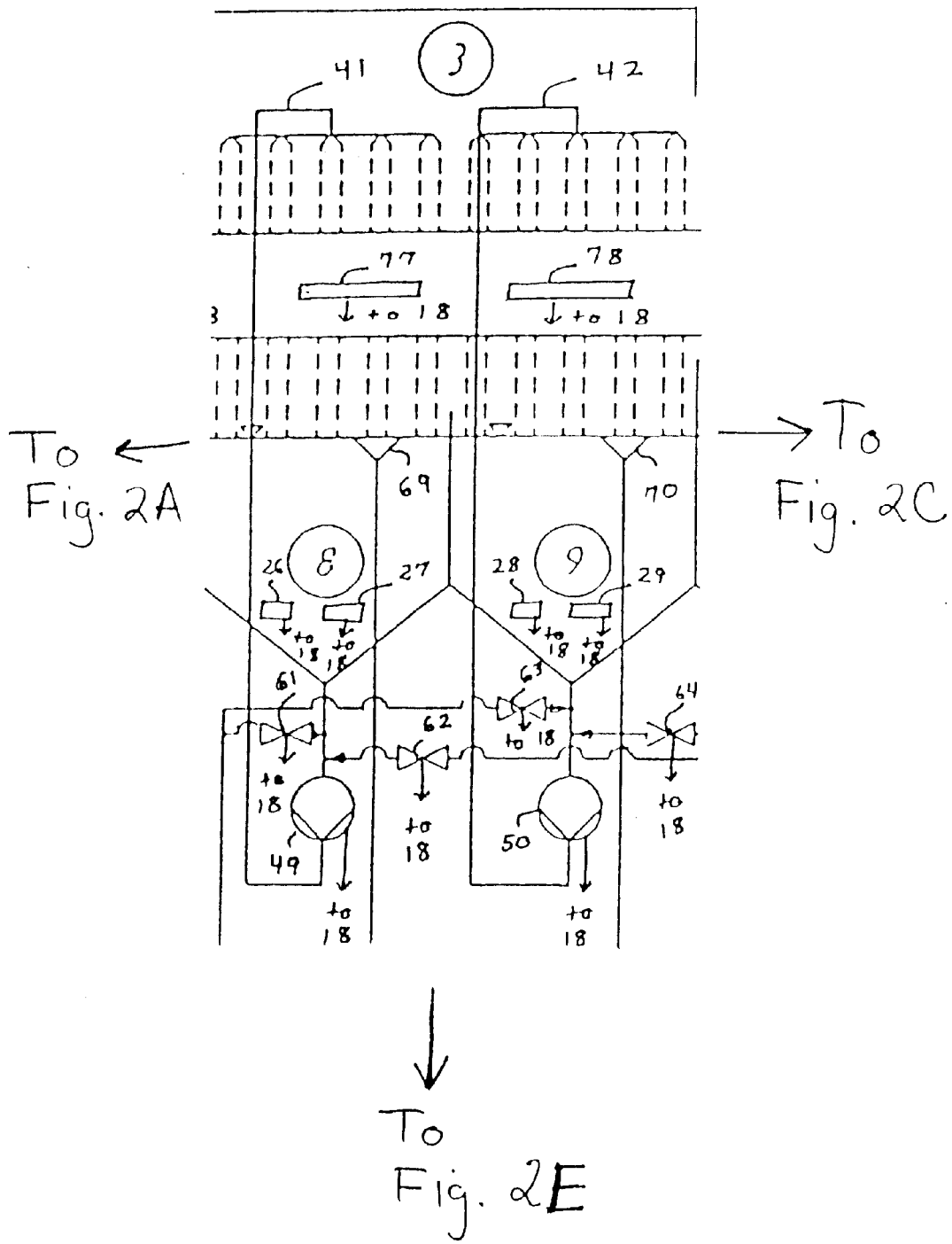
Figure 2C:
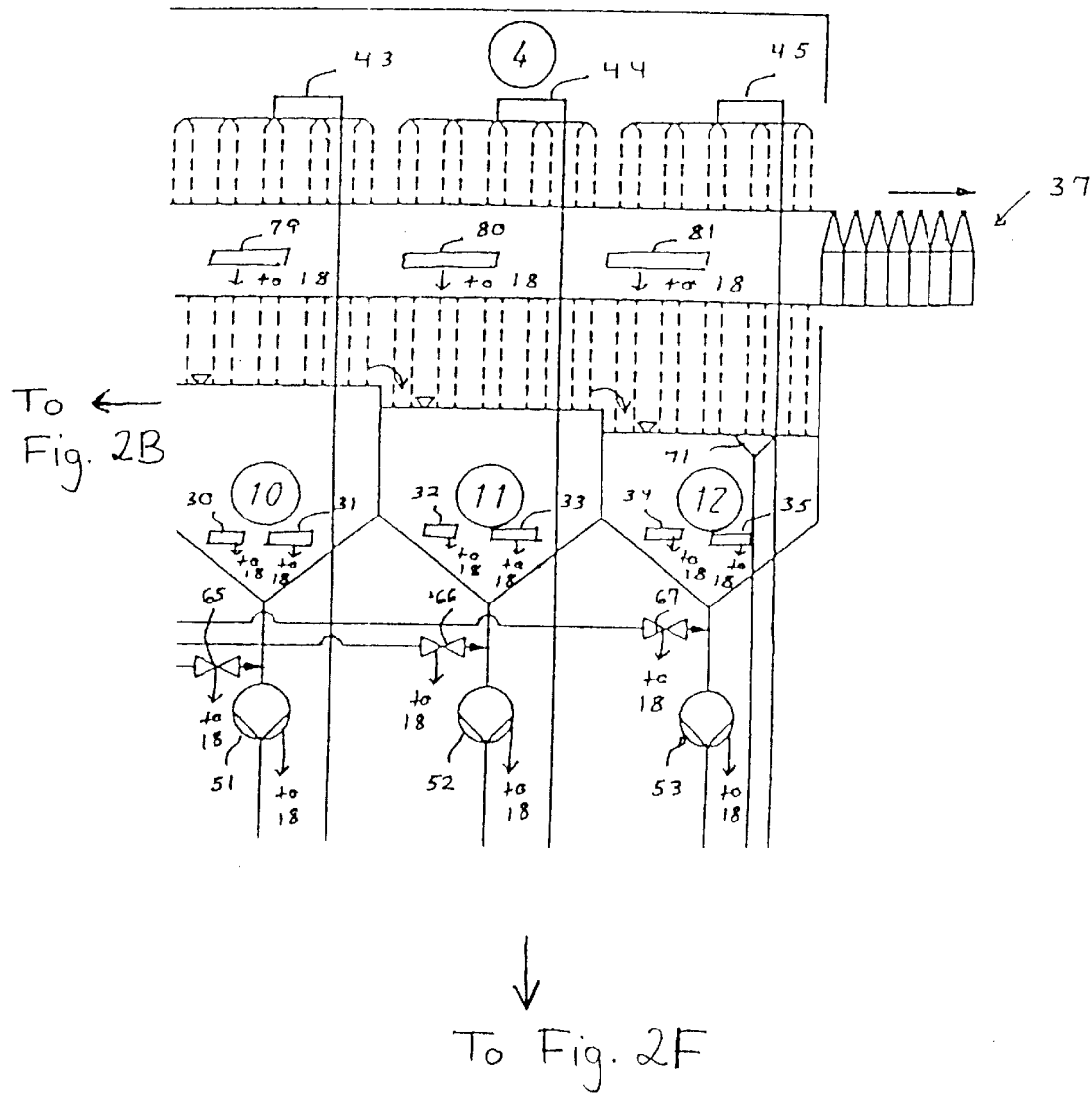
Figure 2D:
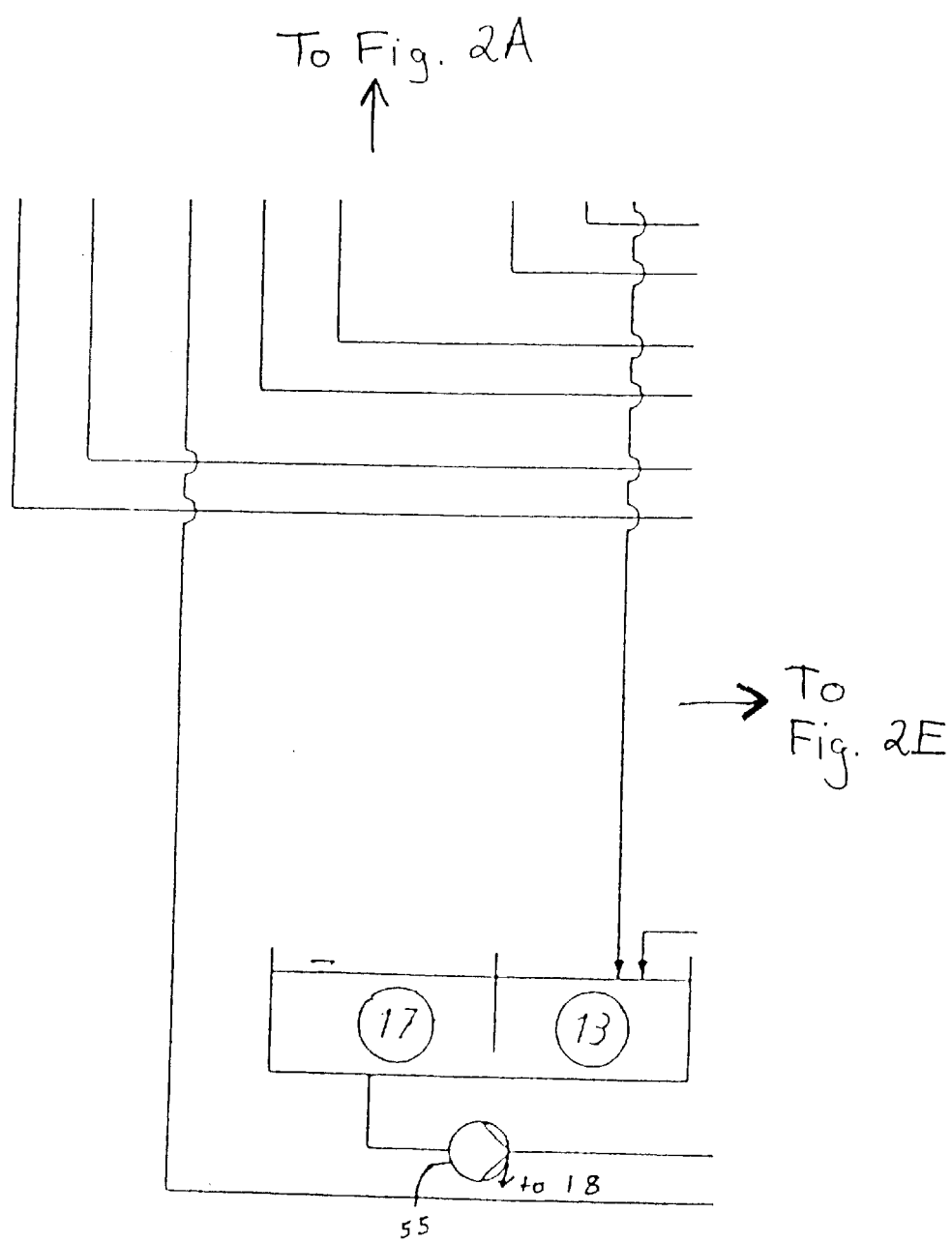
Figure 2E:
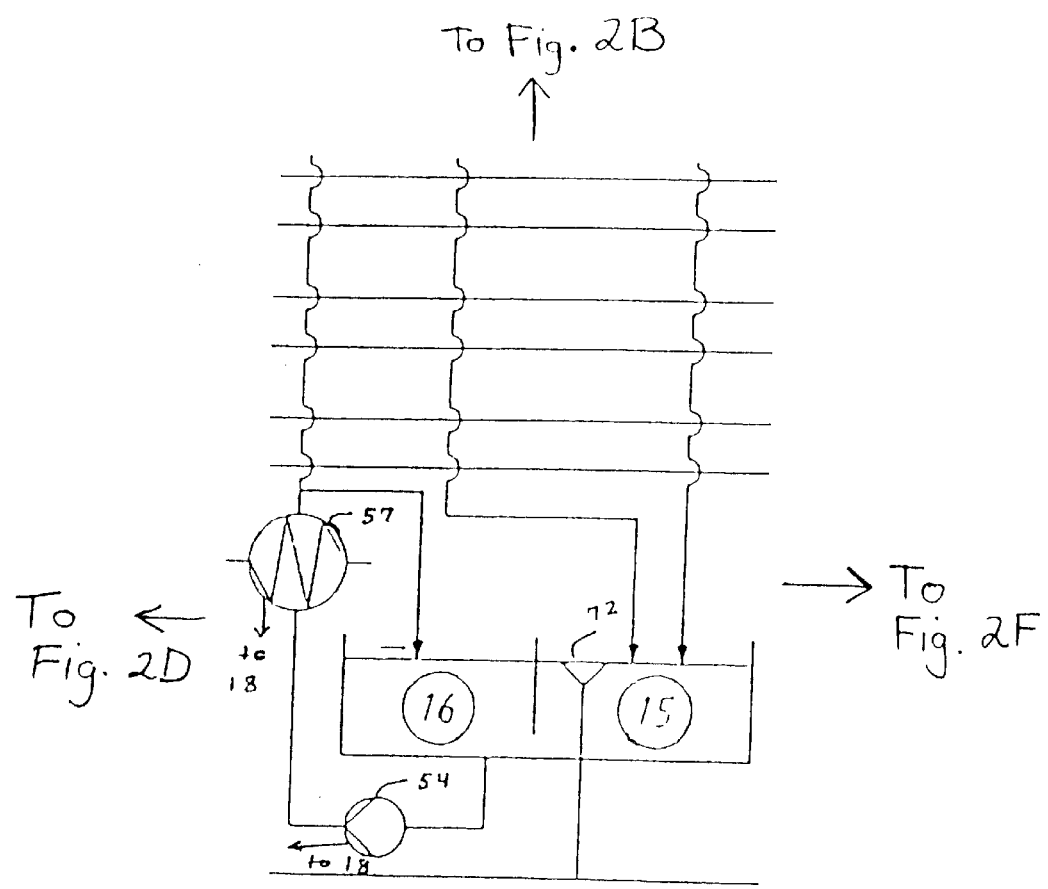
Figure 2F:
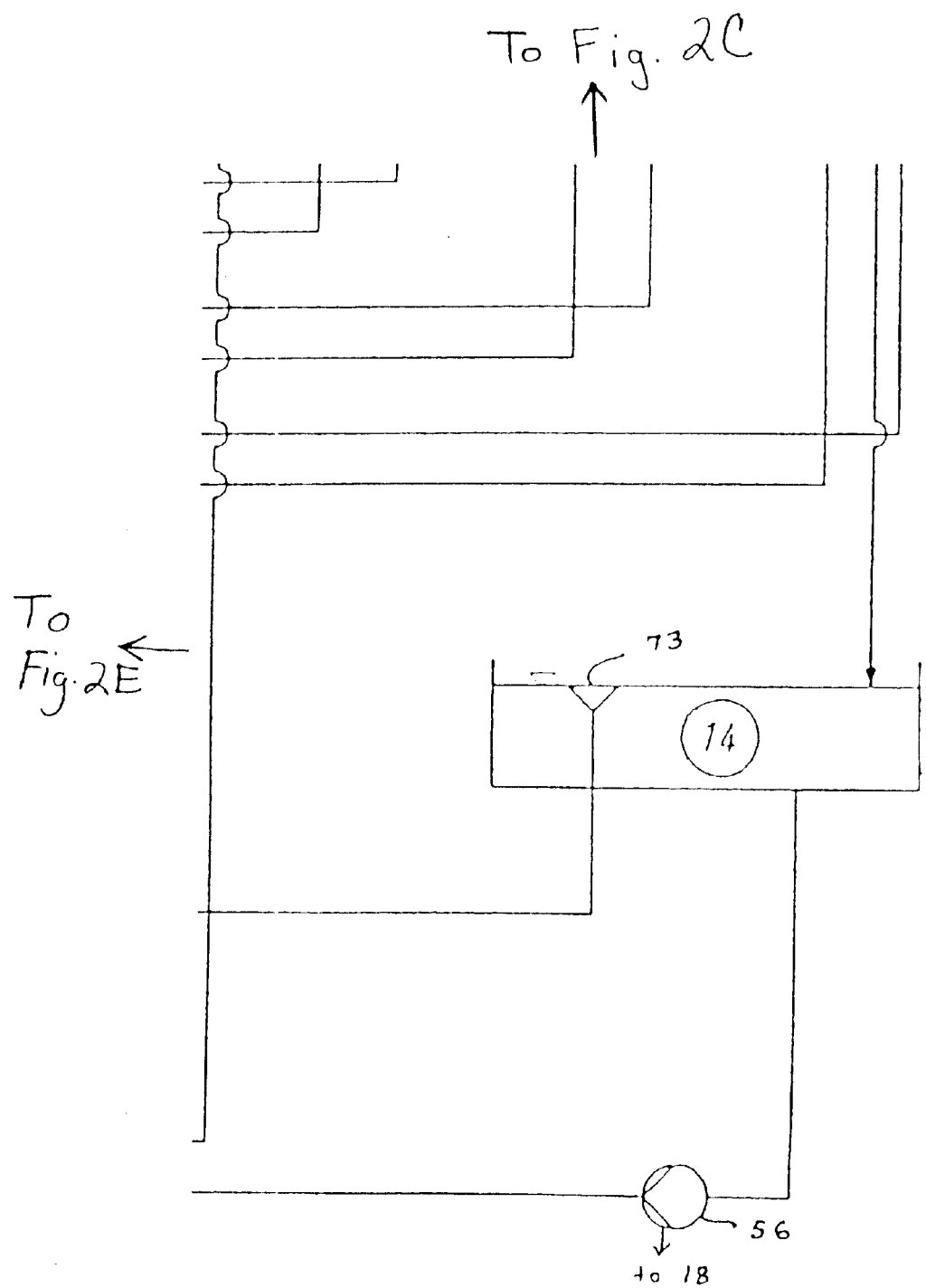
Figure 2G:
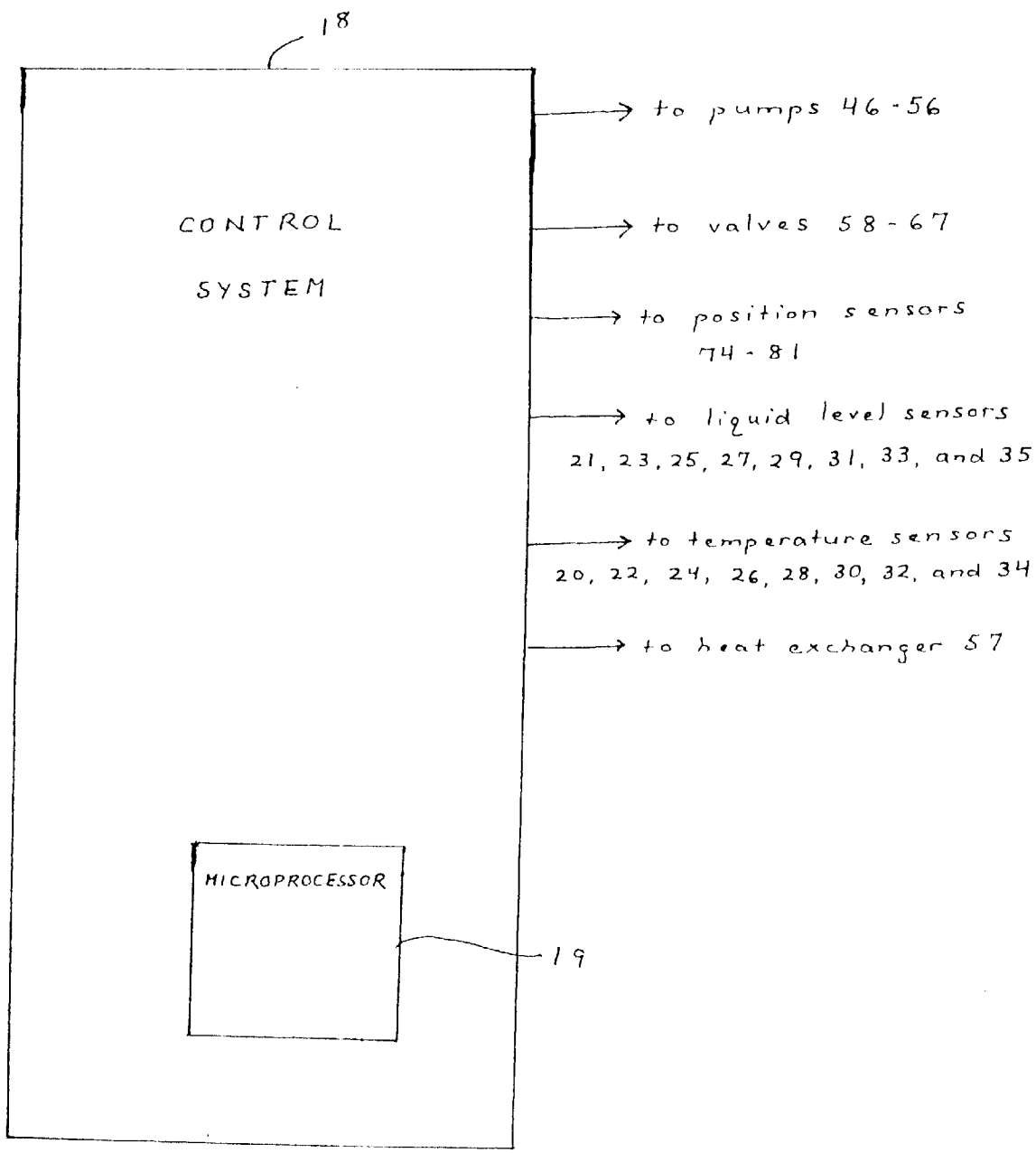
FIG. 2G is an enlarged view of the control system and microprocessor shown in FIG. 2.

In the event of a disruption in production, e.g., a disruption caused by a backup of containers in the bottling plant, a control device or system 18, which control system 18 is shown in FIGS. 1, 2, and 2G, essentially immediately actuates certain of the valves 58–67, which valves 58–67 are shown in FIG. 2, so that, for example, the lower-temperature water from the tank 16 is fed to the superheating and/or pasteurizing zones 8, 9. Lower-temperature water can also be fed to the other sections 2, 4, for example, from an additional fourth tank 14, shown in FIGS. 1, 2, 2F, and 19.

In other words, in at least one possible embodiment of the present invention as shown in FIG. 2, the tanks 5–12, before the pasteurization system is activated, are filled with liquid to a predetermined level regulated by liquid level sensors 21 (for tank 5), 23 (for tank 6), 25 (for tank 7), 27 (for tank 8), 29 (for tank 9), 31 (for tank 10), 33 (for tank 11), and 35 (for tank 12), which liquid level sensors 21, 23, 25, 27, 29, 31, 33, and 35 are shown in FIGS. 1, 2, 2A–2F, and 19. The liquid level sensors 21, 23, 25, 27, 29, 31, 33, and 35 may be located in, or generally at or about, one or more of the tanks 5–12 and are controlled by a control system 18, which control system 18 is preferably controlled by a microprocessor 19, shown in FIGS. 1, 2, and 2G.

The tanks 5–12, before the pasteurization system is activated, are filled with liquid having a predetermined spray temperature regulated by temperature sensors 20 (for tank 5), 22 (for tank 6), 24 (for tank 7), 26 (for tank 8), 28 (for tank 9), 30 (for tank 10), 32 (for tank 11), and 34 (for tank 12), which temperature sensors 20, 22, 24, 26, 28, 30, 32, and 34 are shown in FIGS. 1, 2, 2A–2F, and 19. The tanks 5–12 preferably have heaters to heat the liquid therein to a desired temperature. The spray temperature sensors 20, 22, 24, 26, 28, 30, 32, and 34 may be located in, or generally at or about, one or more of the tanks 5–12 and are controlled by a control system 18, which control system 18 is preferably controlled by a microprocessor 19.

In other words, there are three zones or sections 2–4 in the pasteurization system: the heating section 2, the pasteurization section 3, and the cooling section 4. In the sections 2–4 there are tanks 5–12, which provide liquid to be sprayed over the containers 36. Specifically, tanks 5–7 provide liquid for heating section 2; tanks 8–9 provide liquid for the pasteurizing section 3; and tanks 10–12 provide liquid for the cooling section 4. The tanks 5–12 vary among themselves in the temperature of their liquid contents as follows. In heating section 2, the liquid in tanks 5–7 increases in temperature from tank 5 to tank 7, so that tank 5 and tank 6 contain and spray lower-temperature liquid than does tank 7. In the pasteurizing section 3, tank 8 is the superheating tank, containing and spraying higher-temperature liquid than does the pasteurization tank 9. In the cooling section 4, the liquid contained in and sprayed by tanks 10–12 decrease in temperature from tank 10 to tank 12, so that the temperature of the liquid in tank 10 is higher than the temperature in tank 11, and the temperature of the liquid in tank 11 is higher than the temperature in tank 12.

In another possible embodiment of the present invention, the superheating tank 8 may contain and spray lower-temperature liquid than does the pasteurization tank 9.

Alternatively, in the cooling section 4, the liquid contained in and sprayed by tanks 10–12 increases in temperature from tank 10 to tank 12, so that the temperature of the liquid in tank 10 is lower than the temperature in tank 11, and the temperature of the liquid in tank 11 is lower than the temperature in tank 12.

When containers 36, as shown in FIG. 2, are put on a conveyor belt (not shown) or on some other similar apparatus to enter the pasteurization system or begin the pasteurization process, if there are no stoppages, backups, or disruptions in the system or process or in the movement of the containers 36, shown in FIGS. 1, 2, 2A, and 19, the containers 36 will be moved from the heating section 2, then to the pasteurizing section 3, and then to the cooling section 4. In other words, the containers 36 will be sprayed by liquid provided by the tanks 5–12 in the following order: zone 5, zone 6, zone 7, zone 8, zone 9, zone 10, zone 11, and zone 12. As shown in FIG. 2, this movement of the containers 36 through the sections 2–4 of the pasteurization system will produce pasteurized products 37, shown in FIGS. 1, 2, 2C, and 19.

If there are no stoppages, backups, or disruptions in the system of process or in the movement of the containers 36, the containers 36 move or are moved through the sections 2–4 in a time period within the range of approximately 15 minutes to approximately 20 minutes. In another possible embodiment of the present invention, the containers 36 move or are moved through the sections 2–4 in a time period within the range of approximately 15 minutes to approximately 30 minutes. In yet another possible embodiment of the present invention, the containers 36 move or are moved through the sections 2–4 in a time period within the range of approximately 10 minutes to approximately 45 minutes.

In at least one possible embodiment of the present invention as shown in FIG. 2, spray arrangements or sprayers 38–45 are associated with each of the tanks 5–12 as follows. Spray arrangement 38 is associated with tank 5. Spray arrangement 39 is associated with tank 6. Spray arrangement 40 is associated with tank 7. Spray arrangement 41 is associated with tank 8. Spray arrangement 42 is associated with tank 9. Spray arrangement 43 is associated with tank 10. Spray arrangement 44 is associated with tank 11. Spray arrangement 45 is associated with tank 12. Spray arrangements 38–45 may be located generally at, about, or above their respective tanks 5–12.

In the possible embodiment of the present invention shown in FIG. 2, the spray arrangements 38–45 are supplied with liquid by the tanks 5–12, for example, as follows. Spray arrangement 38 is supplied with liquid by tank 12. Spray arrangement 39 is supplied with liquid by tank 11. Spray arrangement 40 is supplied with liquid by tank 10. Spray arrangement 41 is supplied with liquid by tank 8. Spray arrangement 42 is supplied with liquid by tank 9. Spray arrangement 43 is supplied with liquid by tank 7. Spray arrangement 44 is supplied with liquid by tank 6. Spray arrangement 45 is supplied with liquid by tank 5.

The tanks 7, 8, 9, and 12 supply the tanks 13, 14, and 15 with liquid as follows. Tank 7 supplies tank 13. Tank 8 and tank 9 supply tank 15. Tank 12 supplies tank 14.

Tanks 14, 15, and 16 are supplied with liquid as follows. Tank 13 supplies tank 14. Tank 13 also supplies tank 17 and vice versa. Tank 15 supplies tank 16 and vice versa.

Pumps 46–53, shown in FIG. 2, pump liquid to the spray arrangements 38–45 as follows. Pump 46 pumps liquid to spray arrangement 45. Pump 47 pumps liquid to spray arrangement 44. Pump 48 pumps liquid to spray arrangement 43. Pump 49 pumps liquid to spray arrangement 41. Pump 50 pumps liquid to spray arrangement 42. Pump 51 pumps liquid to spray arrangement 40. Pump 52 pumps liquid to spray arrangement 39. Pump 53 pumps liquid to spray arrangement 38.

Pumps 54–56 pump liquid to tanks 9, 12, and 7 as follows. Pump 54 pumps liquid to tank 9. Pump 55 pumps liquid to tank 12. Pump 56 pumps liquid to tank 7.

Valves 58–67 partly regulate the flow of liquid to pumps 46–53 as follows. Valve 58 allows release of liquid into pump 46. Valve 59 allows release of liquid into pump 47. Valve 60 allows release of liquid into pump 48. Valve 61 allows release of liquid into pump 49. Valve 62 allows release of liquid into pump 49. Valve 63 allows release of liquid into pump 50. Valve 64 allows release of liquid into pump 50. Valve 65 allows release of liquid into pump 51. Valve 66 allows release of liquid into pump 52. Valve 67 allows release of liquid into pump 53.

A heat exchanger 57 regulates the temperature of the liquid passing to tank 16. The heat exchanger 57 is controlled by the control system 18.

Overflow of liquid occurs as follows. Liquid overflows from tank 5 into tank 6, which is lower than tank 5. Liquid overflows from tank 6 into tank 7, which is lower than tank 6. Liquid overflows from tank 7 into tank 13 via an overflow device 68, shown in FIG. 2, which overflow device 68 is located generally on, in, at, or about tank 7. Liquid overflows from tank 8 into tank 15 via an overflow device 69, shown in FIG. 2, which overflow device 69 is located generally on, in, at, or about tank 8. Liquid overflows from tank 9 into tank 15 via an overflow device 70, shown in FIG. 2, which overflow device 70 is located generally on, in, at, or about tank 9. Liquid overflows from tank 10 into tank 11, which is lower than tank 10. Liquid overflows from tank 11 into tank 12, which is lower than tank 11. Liquid flows from tank 12 into tank 14 via an overflow device 71, shown in FIG. 2, which overflow device 71 is located generally on, in, at, or about tank 12. Liquid overflows from tank 15 to tank 13 via an overflow device 72, shown in FIG. 2, which overflow device 72 is located generally on, in, at, or about tank 15. Liquid overflows from tank 14 to tank 13 via an overflow device 73, shown in FIG. 2, which overflow device 73 is located generally on, in, at, or about tank 14.

If there is stoppage, breakage, or another interruption in the continuous container flow 1, tanks 13–17 preferably supply liquid to pumps 46–56, valves 58–67, and spray arrangements 38–45 through at least one of the following pathways. Tank 17 supplies liquid to pump 55; pump 55 pumps liquid to valve 67; valve 67 releases liquid into pump 53; and pump 53 supplies liquid to spray arrangement 38. Tank 17 supplies liquid to pump 55; pump 55 pumps liquid to valve 66; valve 66 releases liquid into pump 52; and pump 52 supplies liquid to spray arrangement 39. Tank 17 supplies liquid to pump 55; pump 55 pumps liquid to valve 65; valve 65 releases liquid into pump 51; and pump 51 supplies liquid to spray arrangement 40. Tank 17 supplies liquid to pump 55; pump 55 pumps liquid to valve 64; valve 64 releases liquid into pump 50; and pump 50 supplies liquid to spray arrangement 42. Tank 16 supplies liquid to pump 54; pump 54 pumps liquid to valve 63; valve 63 releases liquid into pump 50; and pump 50 supplies liquid to spray arrangement 42. Tank 17 supplies liquid to pump 55; pump 55 pumps liquid to valve 62; valve 62 releases liquid into pump 49; and pump 49 supplies liquid to spray arrangement 41. Tank 16 supplies liquid to pump 54; pump 54 pumps liquid to valve 61; valve 61 releases liquid into pump 49; and pump 49 supplies liquid to spray arrangement 41. Tank 14 supplies liquid to pump 56; pump 56 pumps liquid to valve 60; valve 60 releases liquid into pump 48; and pump 48 supplies liquid to spray arrangement 43. Tank 14 supplies liquid to pump 56; pump 56 pumps liquid to valve 59; valve 59 releases liquid into pump 47; and pump 47 supplies liquid to spray arrangement 44. Tank 14 supplies liquid to pump 56; pump 56 pumps liquid to valve 58; valve 58 releases liquid into pump 46; and pump 46 supplies liquid to spray arrangement 45.

The conveyor belt (not shown) or other apparatus for moving the containers 36 has position, proximity, or movement sensors 74–81 for detecting the presence of containers 36 as follows. Position sensor 74 is associated with tank 5 and spray arrangement 38. Position sensor 75 is associated with tank 6 and spray arrangement 39. Position sensor 76 is associated with tank 7 and spray arrangement 40. Position sensor 77 is associated with tank 8 and spray arrangement 41. Position sensor 78 is associated with tank 9 and spray arrangement 42. Position sensor 79 is associated with tank 10 and spray arrangement 43. Position sensor 80 is associated with tank 11 and spray arrangement 44. Position sensor 81 is associated with tank 12 and spray arrangement 45. Position sensors 74–81 may be located generally on, in, at, or about the conveyor belt or other apparatus for moving the containers 36 and 37. Alternatively, position sensors 74–81 may be located generally on, at, or about the tanks 5–12.

The control system 18, as shown in FIGS. 2 and 2G, is connected to and controls pumps 46–56; valves 58–67; position sensors 74–81; liquid level sensors 21, 23, 25, 27, 29, 31, 33, and 35; temperature sensors 20, 22, 24, 26, 28, 30, 32, and 34; and heat exchanger 57. As shown in FIGS. 2 and 2G, the control system 18 is preferably operated by means of a microprocessor 19.

FIGS. 3–18 are flow charts illustrating possible operation of the pasteurization system. FIGS. 3–8 illustrate possible embodiments of the present invention in which there is an interruption or stoppage in the flow of containers or bottles. FIGS. 9–14 are flow charts illustrating startup of the pasteurization system in at least one possible embodiment of the present invention. For example, FIGS. 9–14 present possible decision trees for spraying the first flow of bottles or containers that passes through the pasteurization system after this system has been turned on or activated. FIGS. 15–18 illustrate emptying each of the heating zone 2, the pasteurization zone 3, and the cooling zone 4 of bottles until there are no bottles sensed by any of the position sensors 74–81. In other words, FIGS. 15–18 preferably illustrate at least one possible embodiment of the present invention in which the pasteurization system is shut down.

Figure 3:
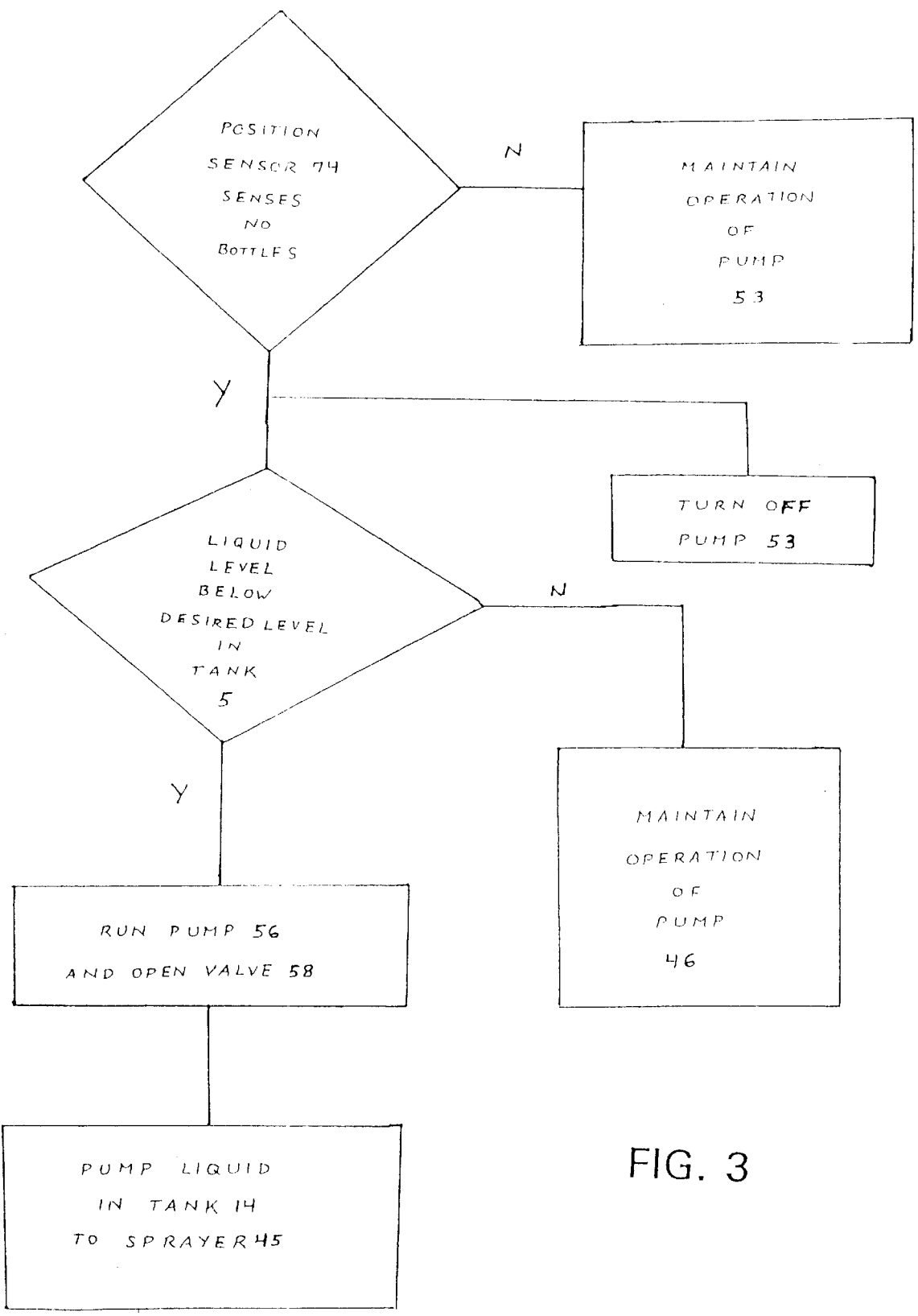
FIGS. 3–18 are flow charts for the operation of the heat stabilizing system shown in FIGS. 2 and 2A–2G.

In FIG. 3, if position sensor 74 senses bottles or containers, the operation of pump 53 is maintained. If position sensor 74 senses no bottles, pump 53 is turned off and a determination is made whether the liquid level in tank 5 is below the desired liquid level in tank 5. If the liquid level in tank 5 is not below the desired liquid level in tank 5, the operation of pump 46 is maintained. If the liquid level in tank 5 is below the desired liquid level in tank 5, pump 56 is run and valve 58 is opened so that liquid in tank 14 may be pumped to sprayer 45.

Figure 4:
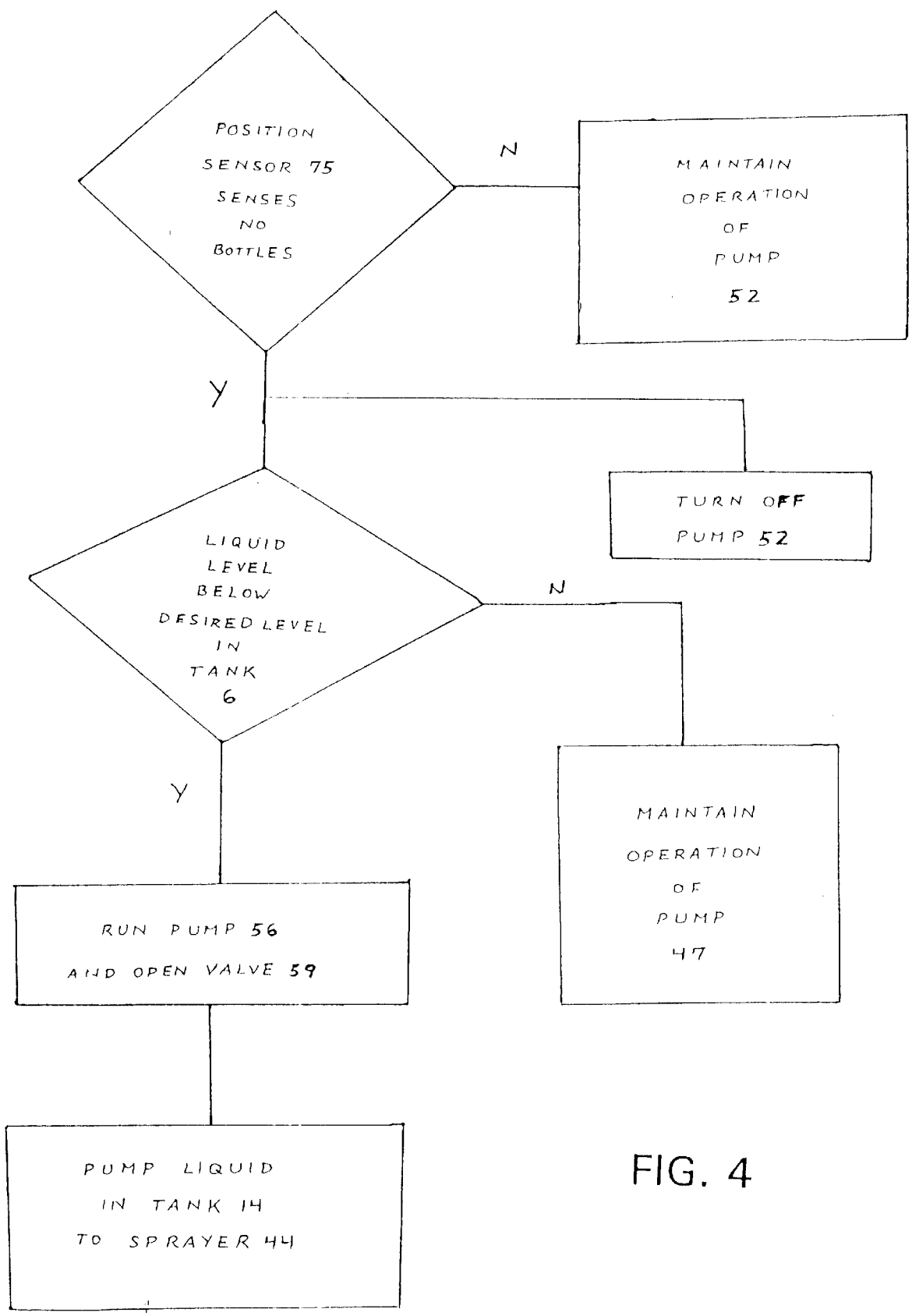

In FIG. 4, if position sensor 75 senses bottles or containers, the operation of pump 52 is maintained. If position sensor 75 senses no bottles, pump 52 is turned off and a determination is made whether the liquid level in tank 6 is below the desired liquid level in tank 6. If the liquid level in tank 6 is not below the desired liquid level in tank 6, the operation of pump 47 is maintained. If the liquid level in tank 6 is below the desired liquid level in tank 6, pump 56 is run and valve 59 is opened so that liquid in tank 14 may be pumped to sprayer 44.

Figure 5:
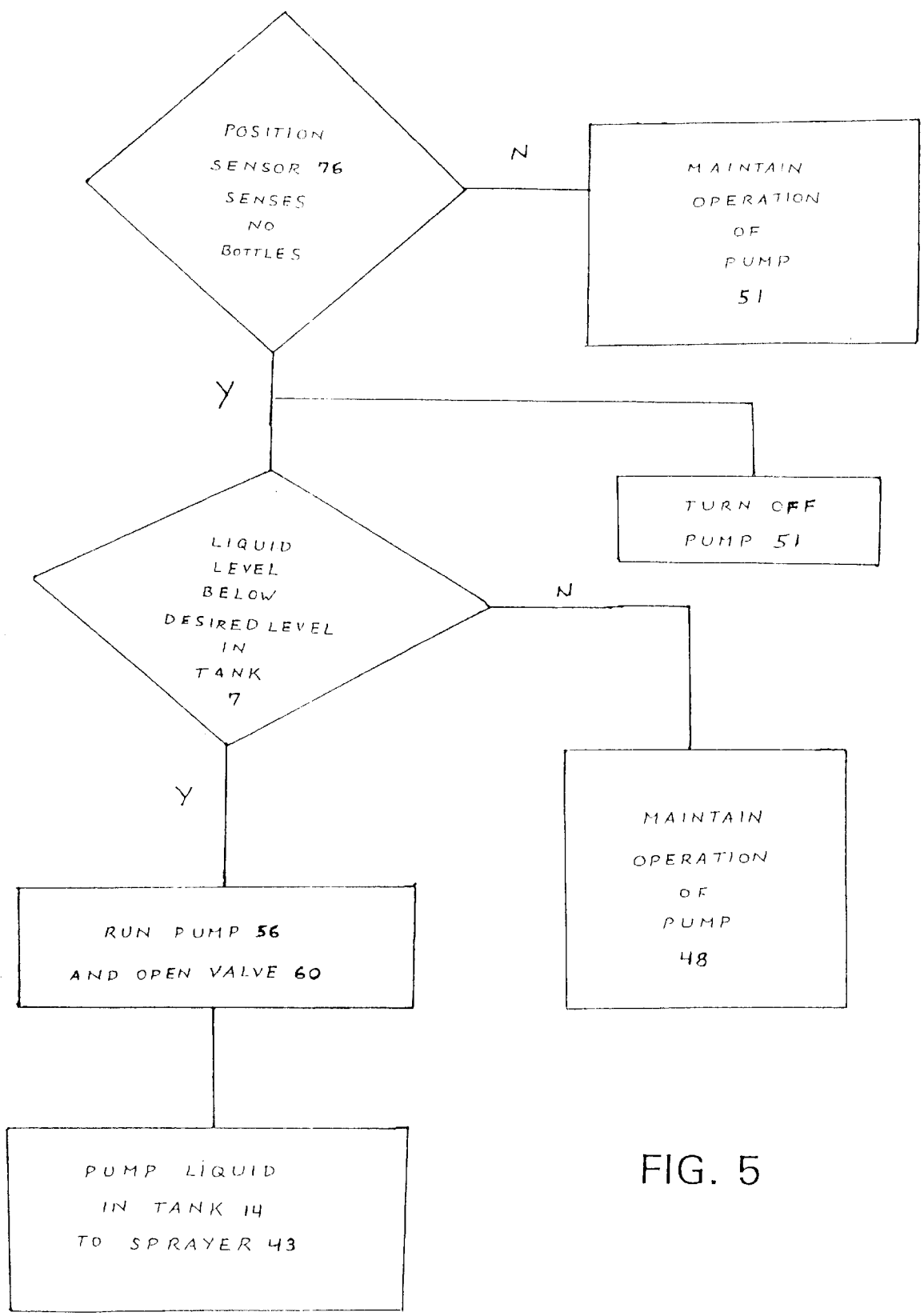

In FIG. 5, if position sensor 76 senses bottles or containers, the operation of pump 51 is maintained. If position sensor 76 senses no bottles, pump 51 is turned off and a determination is made whether the liquid level in tank 7 is below the desired liquid level in tank 7. If the liquid level in tank 7 is not below the desired liquid level in tank 7, the operation of pump 48 is maintained. If the liquid level in tank 7 is below the desired liquid level in tank 7, pump 56 is run and valve 60 is opened so that liquid in tank 14 may be pumped to sprayer 43.

Figure 6:
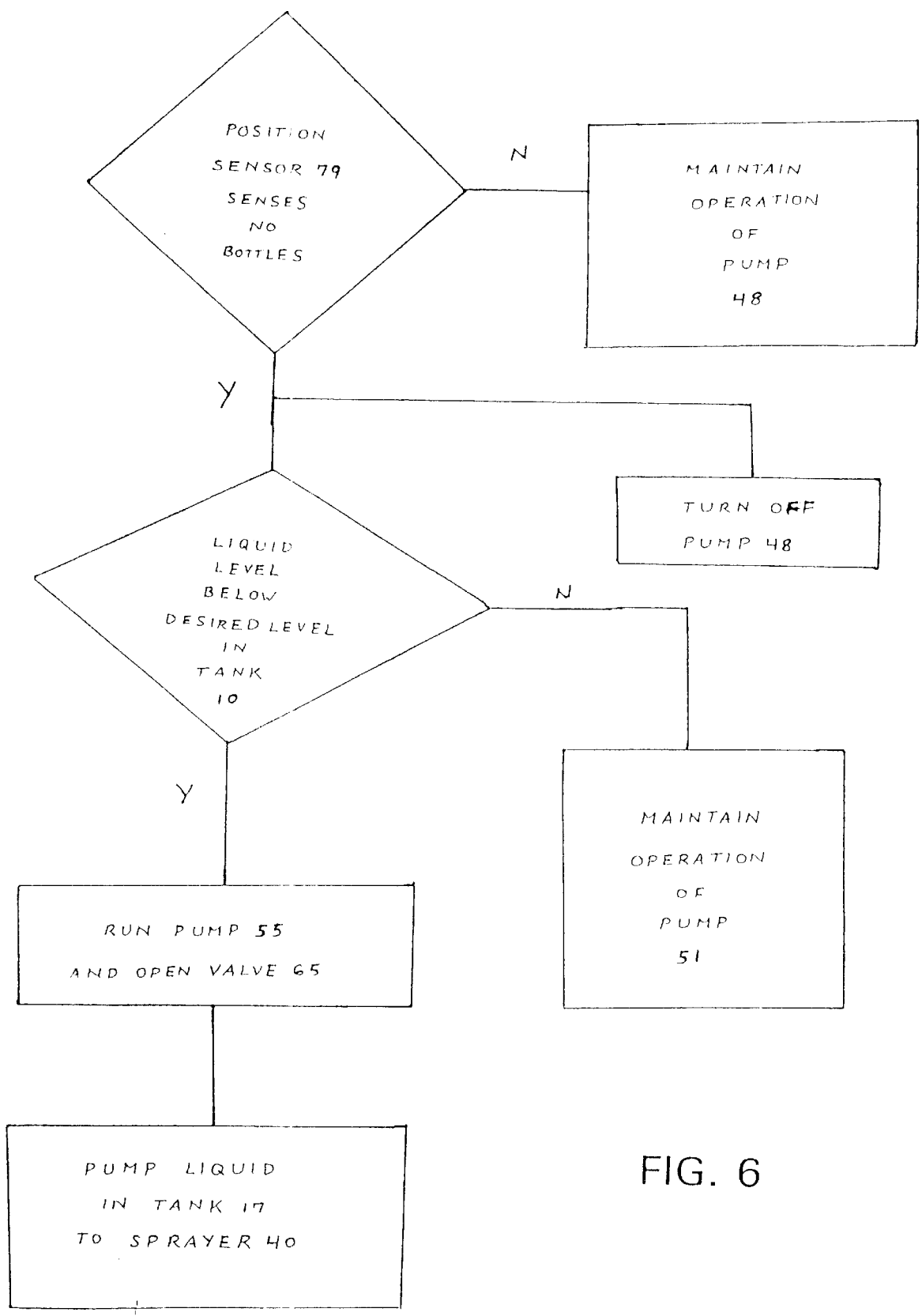

In FIG. 6, if position sensor 79 senses bottles or containers, the operation of pump 48 is maintained. If position sensor 79 senses no bottles, pump 48 is turned off and a determination is made whether the liquid level in tank 10 is below the desired liquid level in tank 10. If the liquid level in tank 10 is not below the desired liquid level in tank 10, the operation of pump 51 is maintained. If the liquid level in tank 10 is below the desired liquid level in tank 10, pump 55 is run and valve 65 is opened so that liquid in tank 17 may be pumped to sprayer 40.

Figure 7:
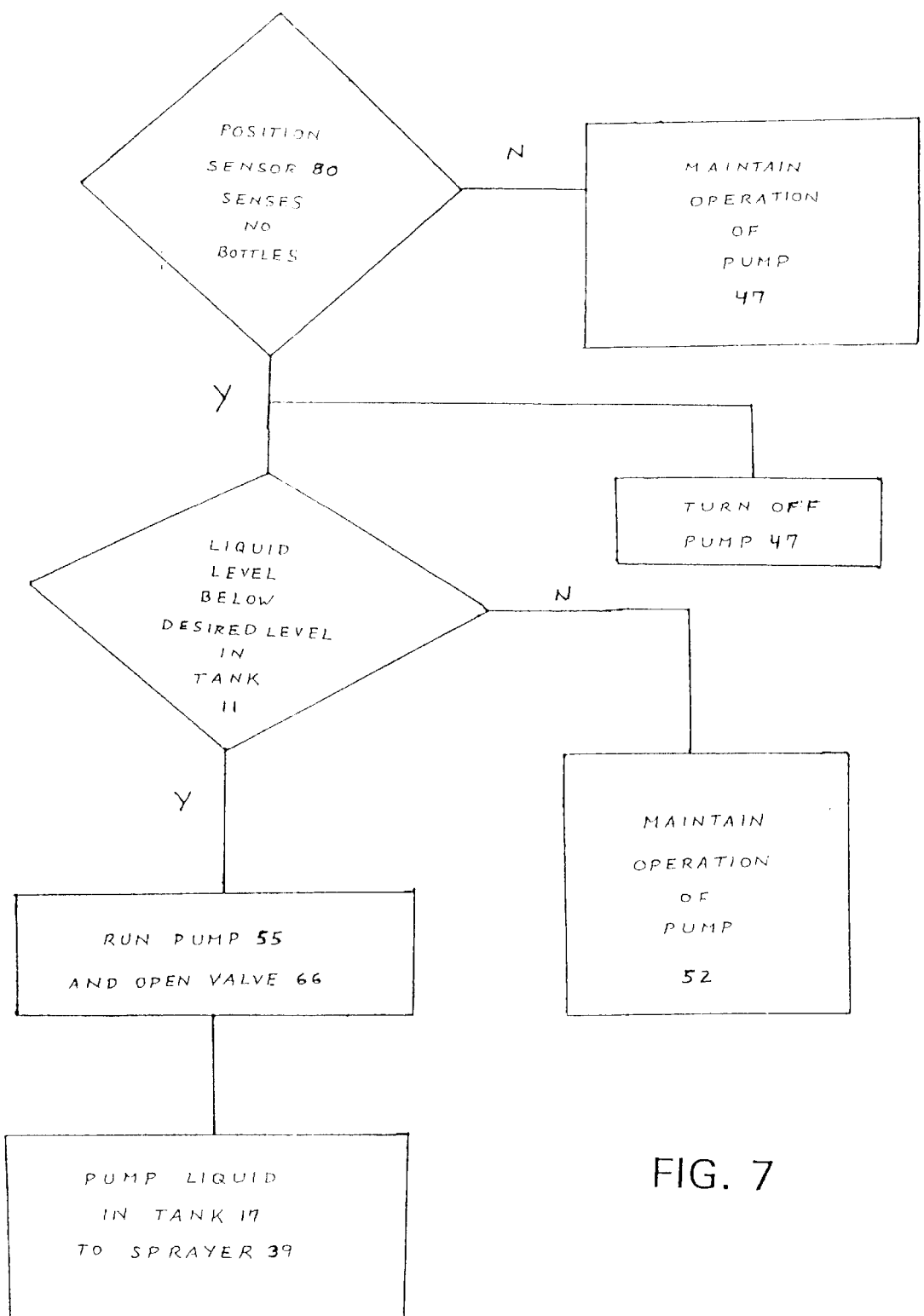

In FIG. 7, if position sensor 80 senses bottles or containers, the operation of pump 47 is maintained. If position sensor 80 senses no bottles, pump 47 is turned off and a determination is made whether the liquid level in tank 11 is below the desired liquid level in tank 11. If the liquid level in tank 11 is not below the desired liquid level in tank 11, the operation of pump 52 is maintained. If the liquid level in tank 11 is below the desired liquid level in tank 11, pump 55 is run and valve 66 is opened so that liquid in tank 17 may be pumped to sprayer 39.

Figure 8:
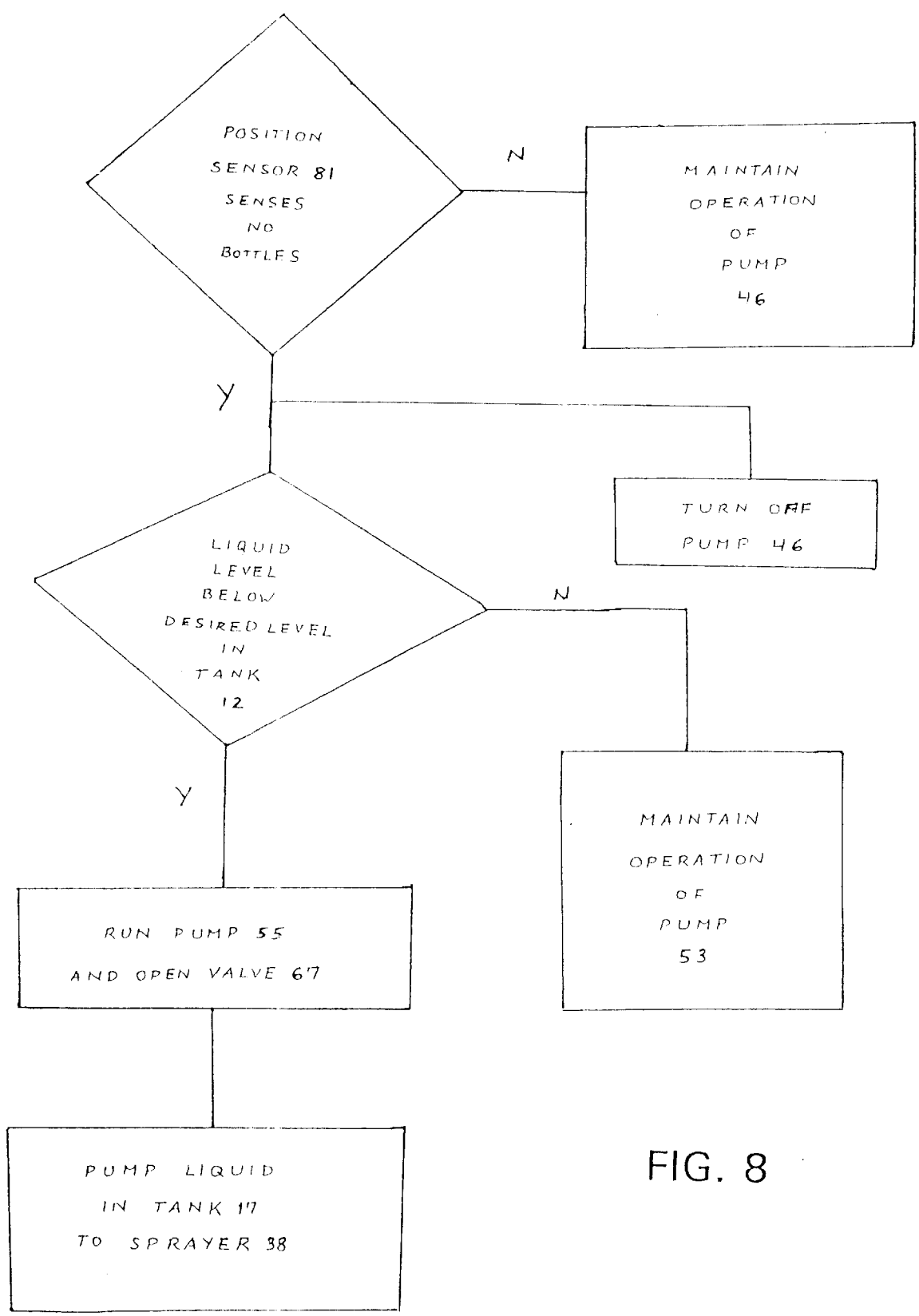

In FIG. 8, if position sensor 81 senses bottles or containers, the operation of pump 46 is maintained. If position sensor 81 senses no bottles, pump 46 is turned off and a determination is made whether the liquid level in tank 12 is below the desired liquid level in tank 12. If the liquid level in tank 12 is not below the desired liquid level in tank 12, the operation of pump 53 is maintained. If the liquid level in tank 12 is below the desired liquid level in tank 12, pump 55 is run and valve 67 is opened so that liquid in tank 17 may be pumped to sprayer 38.

Figure 9:
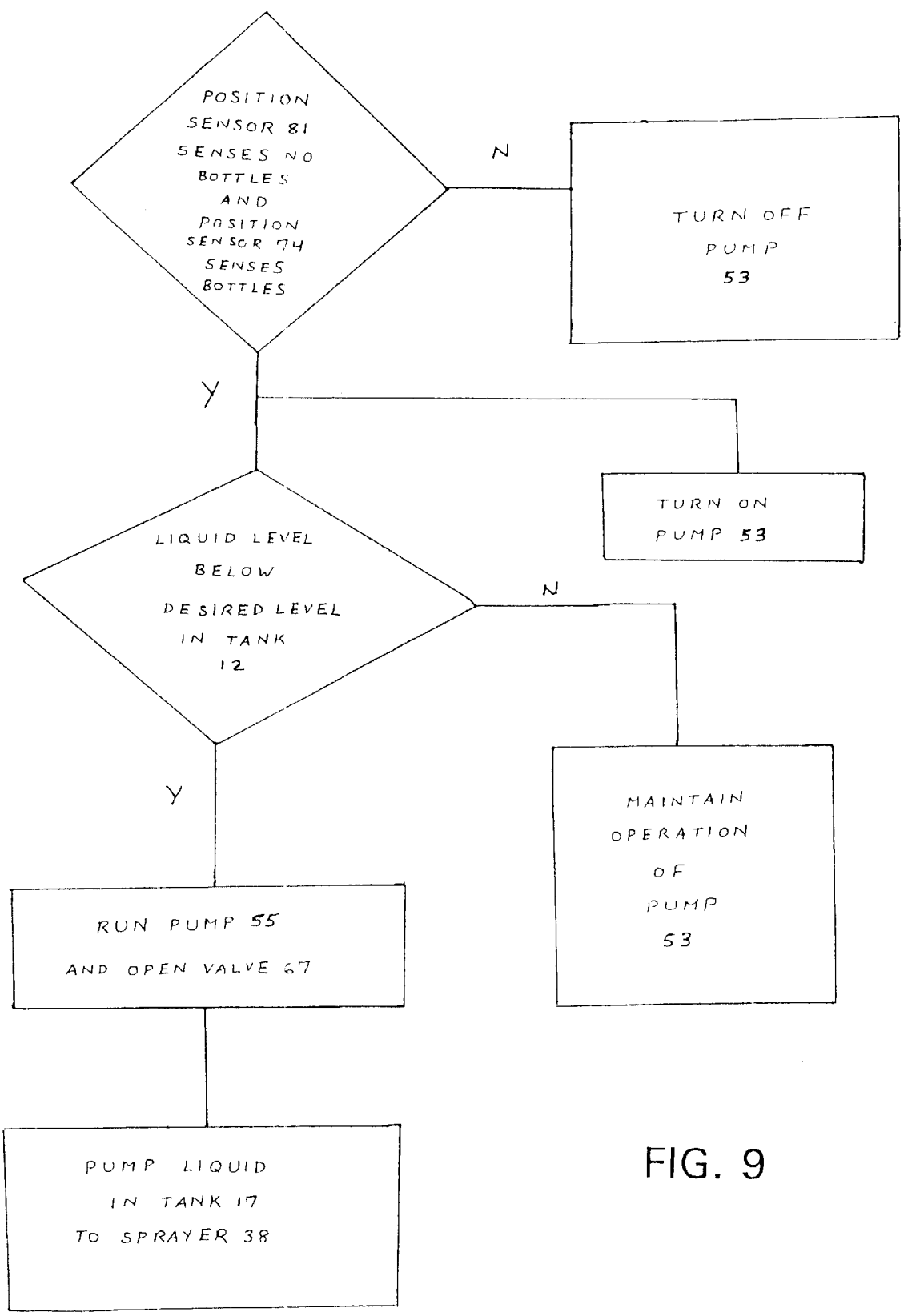

In FIG. 9, if position sensor 81 senses no bottles and position sensor 74 senses no bottles, pump 53 is turned off. If position sensor 81 senses no bottles and position sensor 74 senses bottles, pump 53 is turned on and a determination is made whether the liquid level in tank 12 is below the desired liquid level in tank 12. If the liquid level in tank 12 is not below the desired liquid level in tank 12, the operation of pump 53 is maintained. If the liquid level in tank 12 is below the desired liquid level in tank 12, pump 55 is run and valve 67 is opened so that liquid in tank 17 may be pumped to sprayer 38.

Figure 10:
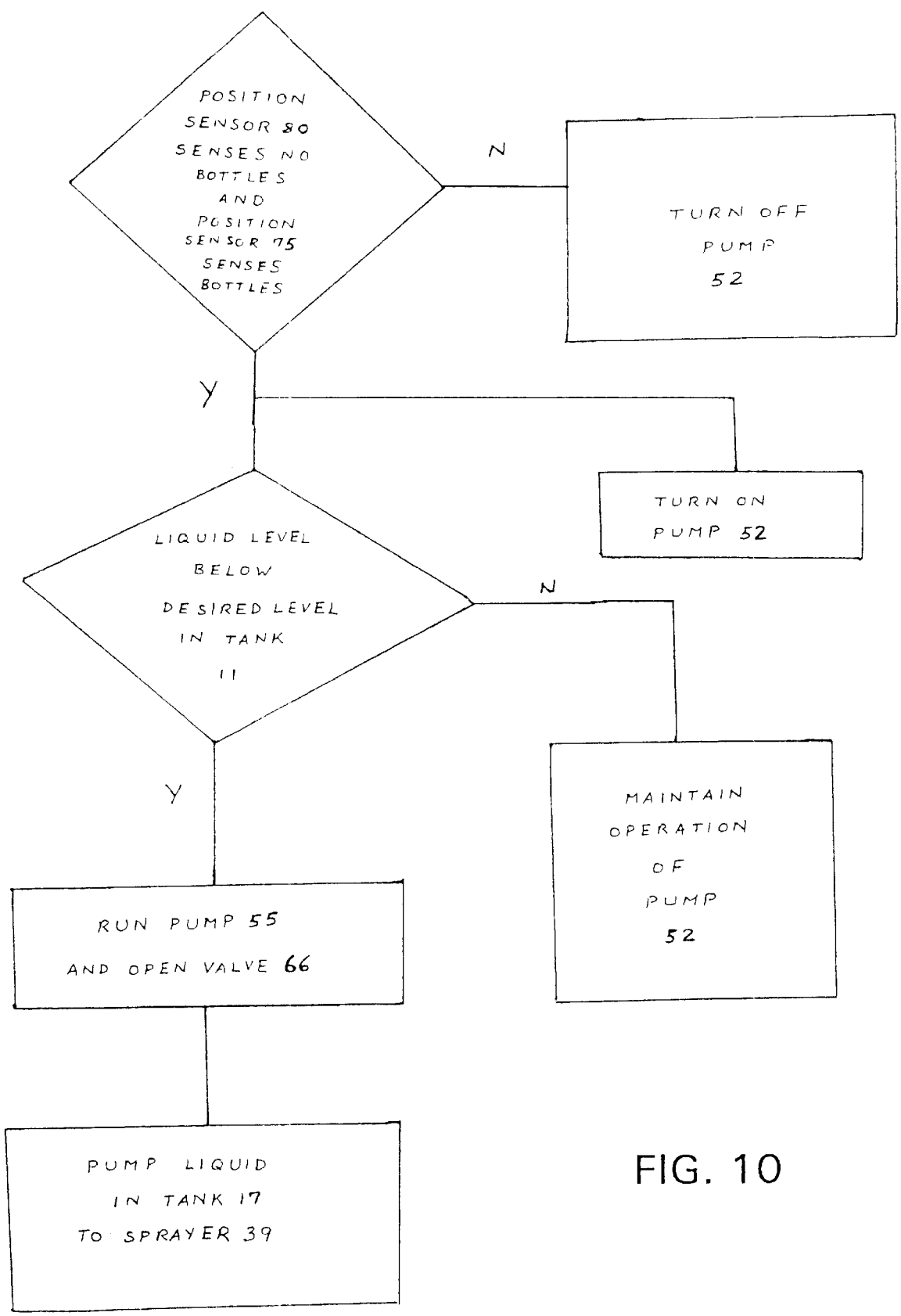

In FIG. 10, if position sensor 80 senses no bottles and position sensor 75 senses no bottles, pump 52 is turned off. If position sensor 80 senses no bottles and position sensor 75 senses bottles, pump 52 is turned on and a determination is made whether the liquid level in tank 11 is below the desired liquid level in tank 11. If the liquid level in tank 11 is not below the desired liquid level in tank 11, the operation of pump 52 is maintained. If the liquid level in tank 11 is below the desired liquid level in tank 11, pump 55 is run and valve 66 is opened so that liquid in tank 17 may be pumped to sprayer 39.

Figure 11:
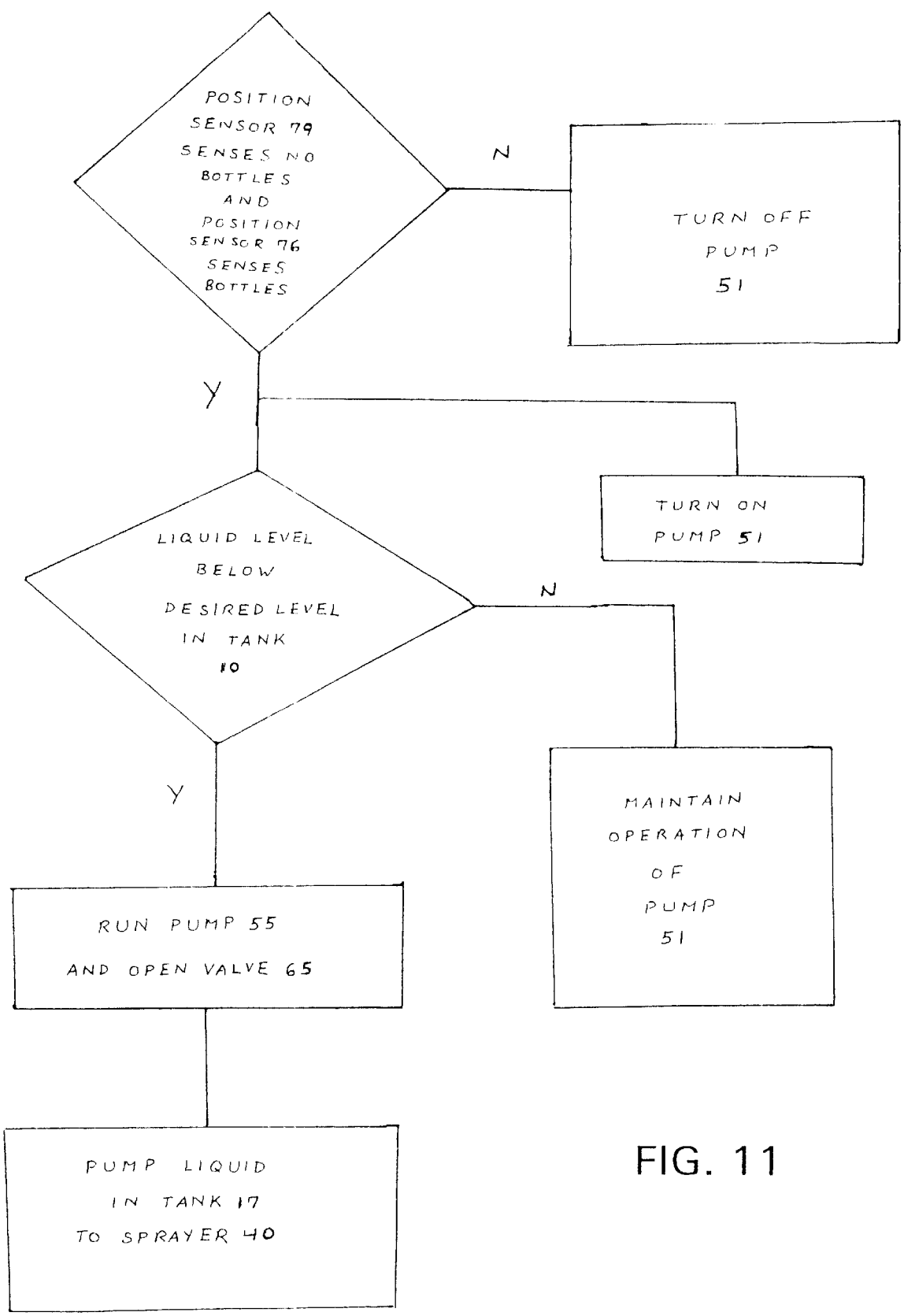

In FIG. 11, if position sensor 79 senses no bottles and position sensor 76 senses no bottles, pump 51 is turned off. If position sensor 79 senses no bottles and position sensor 76 senses bottles, pump 51 is turned on and a determination is made whether the liquid level in tank 10 is below the desired liquid level in tank 10. If the liquid level in tank 10 is not below the desired liquid level in tank 10, the operation of pump 51 is maintained. If the liquid level in tank 10 is below the desired liquid level in tank 10, pump 55 is run and valve 65 is opened so that liquid in tank 17 may be pumped to sprayer 40.

Figure 12:
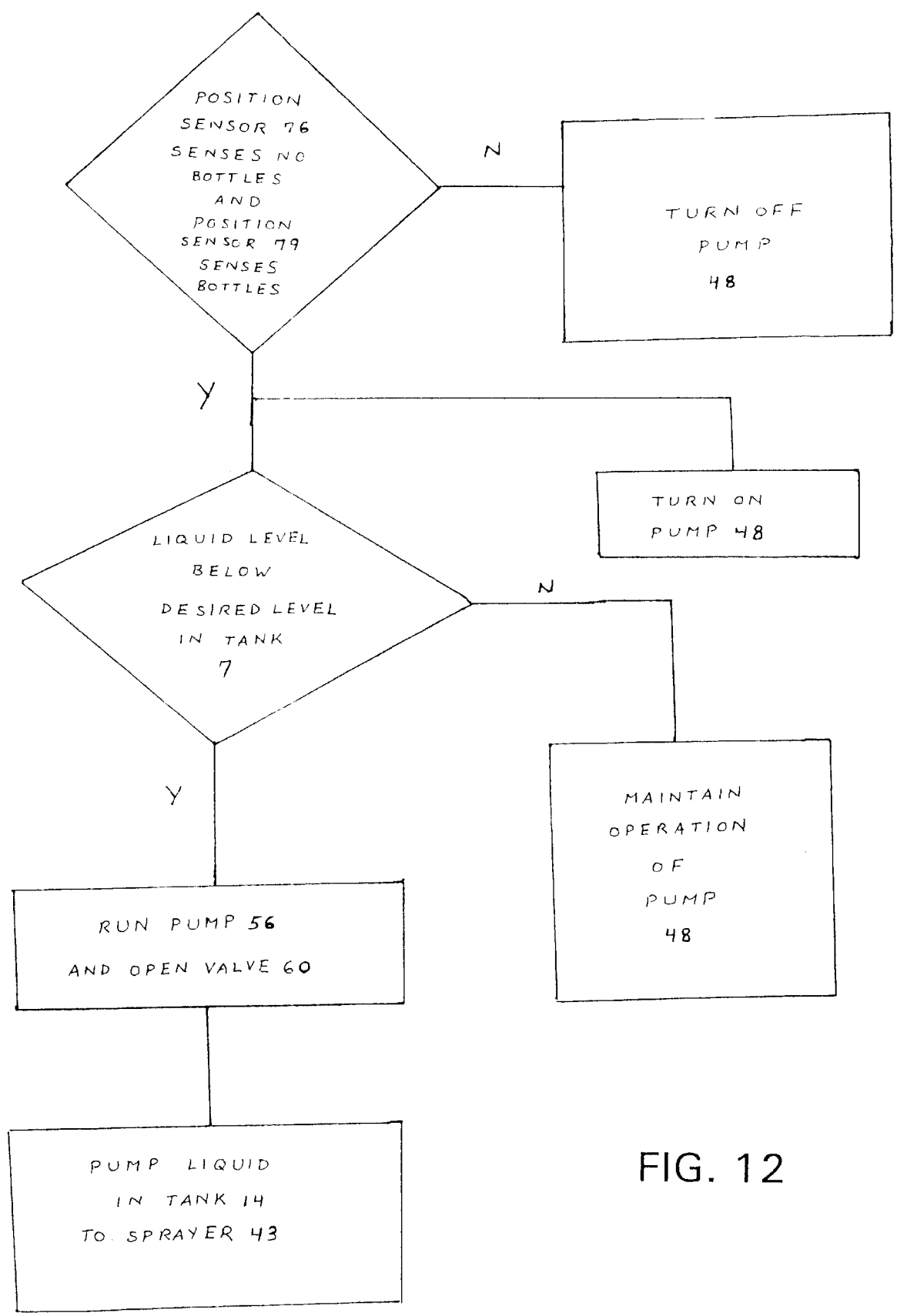

In FIG. 12, if position sensor 76 senses no bottles and position sensor 79 senses no bottles, pump 48 is turned off. If position sensor 76 senses no bottles and position sensor 79 senses bottles, pump 48 is turned on and a determination is made whether the liquid level in tank 7 is below the desired liquid level in tank 7. If the liquid level in tank 7 is not below the desired liquid level in tank 7, the operation of pump 48 is maintained. If the liquid level in tank 7 is below the desired liquid level in tank 7, pump 56 is run and valve 60 is opened so that liquid in tank 14 may be pumped to sprayer 43.

Figure 13:
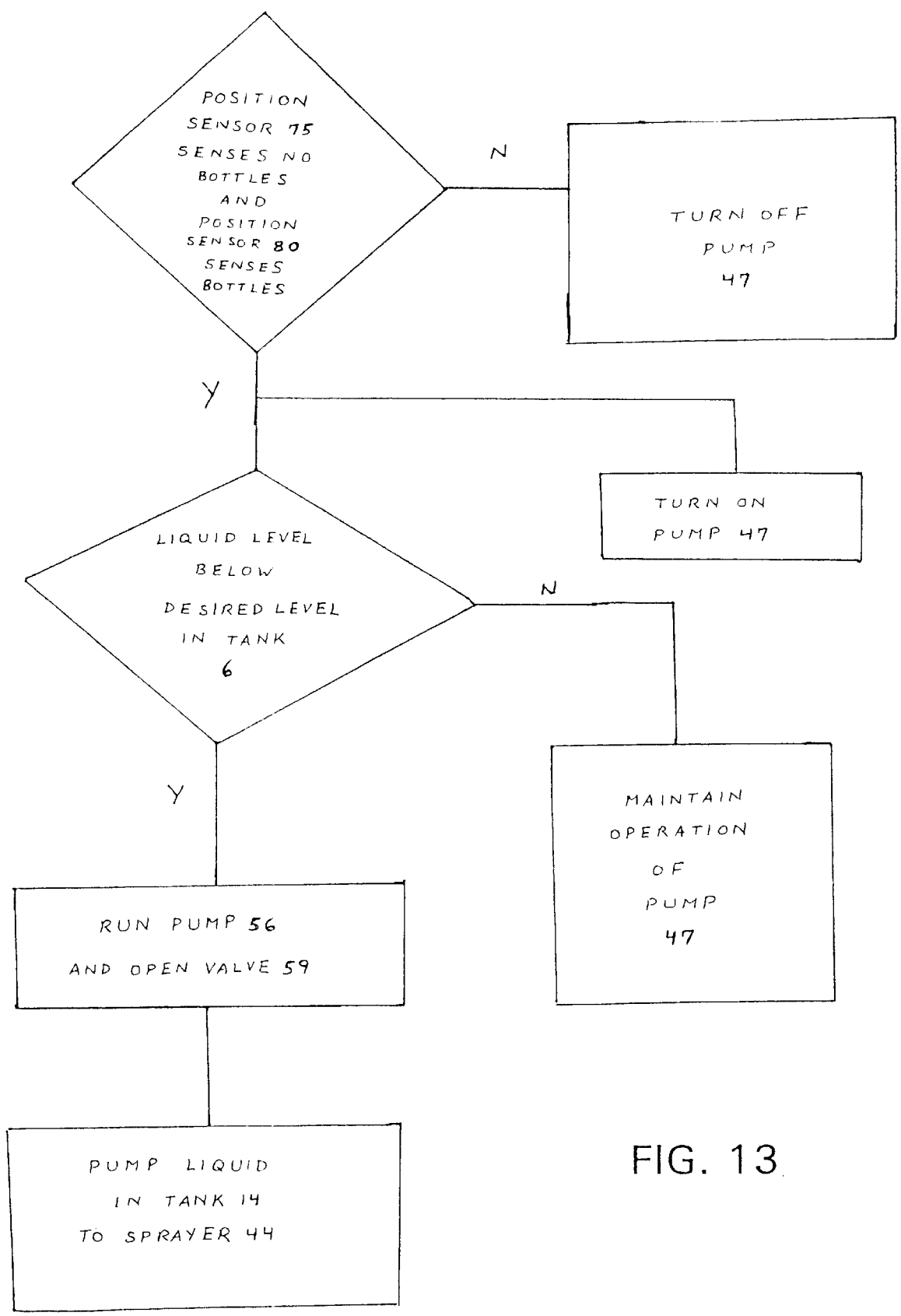

In FIG. 13, if position sensor 75 senses no bottles and position sensor 80 senses no bottles, pump 47 is turned off. If position sensor 75 senses no bottles and position sensor 80 senses bottles, pump 47 is turned on and a determination is made whether the liquid level in tank 6 is below the desired liquid level in tank 6. If the liquid level in tank 6 is not below the desired liquid level in tank 6, the operation of pump 47 is maintained. If the liquid level in tank 6 is below the desired liquid level in tank 6, pump 56 is run and valve 59 is opened so that liquid in tank 14 may be pumped to sprayer 44.

Figure 14:
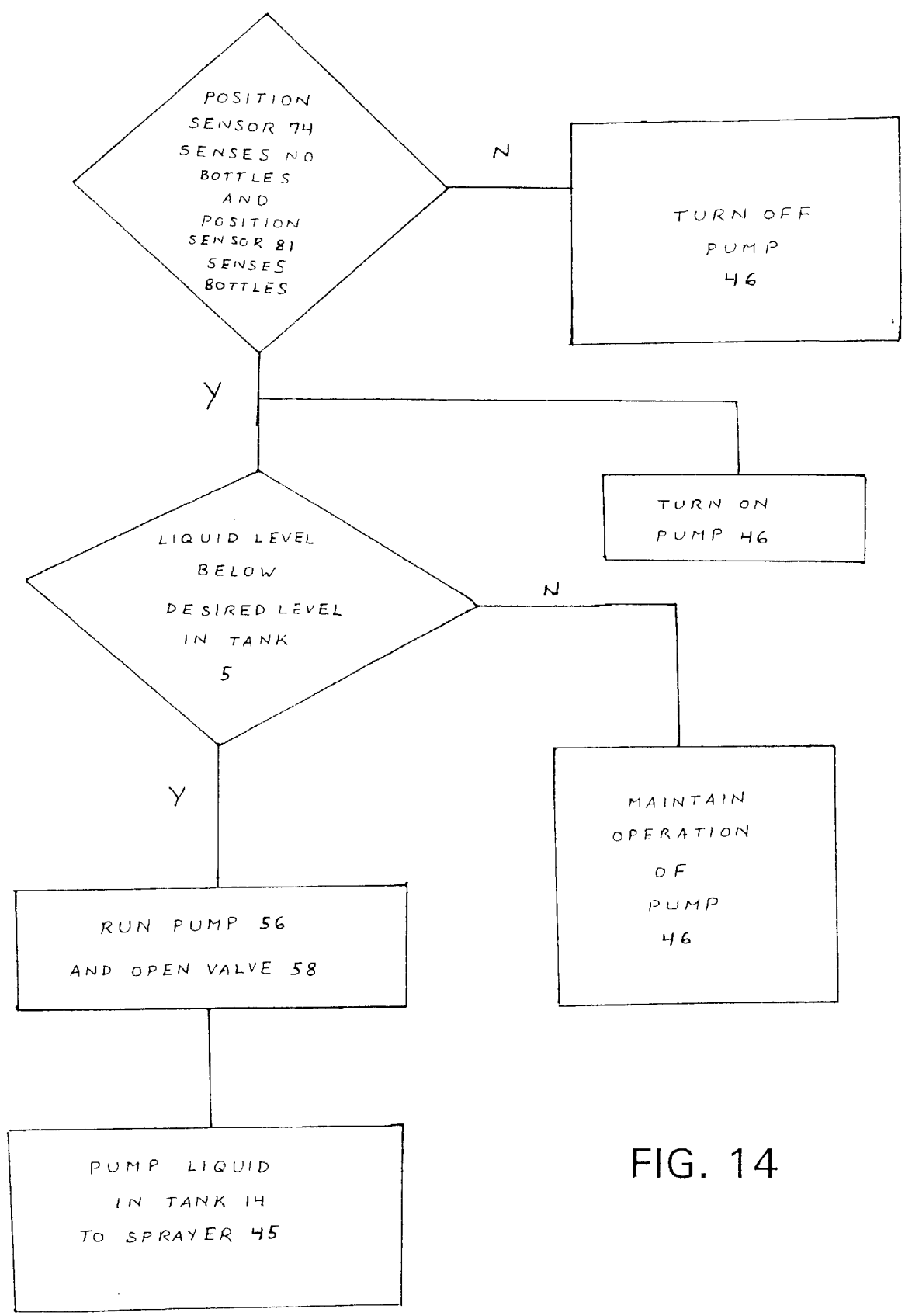

In FIG. 14, if position sensor 74 senses no bottles and position sensor 81 senses no bottles, pump 46 is turned off. If position sensor 74 senses no bottles and position sensor 81 senses bottles, pump 46 is turned on and a determination is made whether the liquid level in tank 5 is below the desired liquid level in tank 5. If the liquid level in tank 5 is not below the desired liquid level in tank 5, the operation of pump 46 is maintained. If the liquid level in tank 5 is below the desired liquid level in tank 5, pump 56 is run and valve 58 is opened so that liquid in tank 14 may be pumped to sprayer 45.

Figure 15:
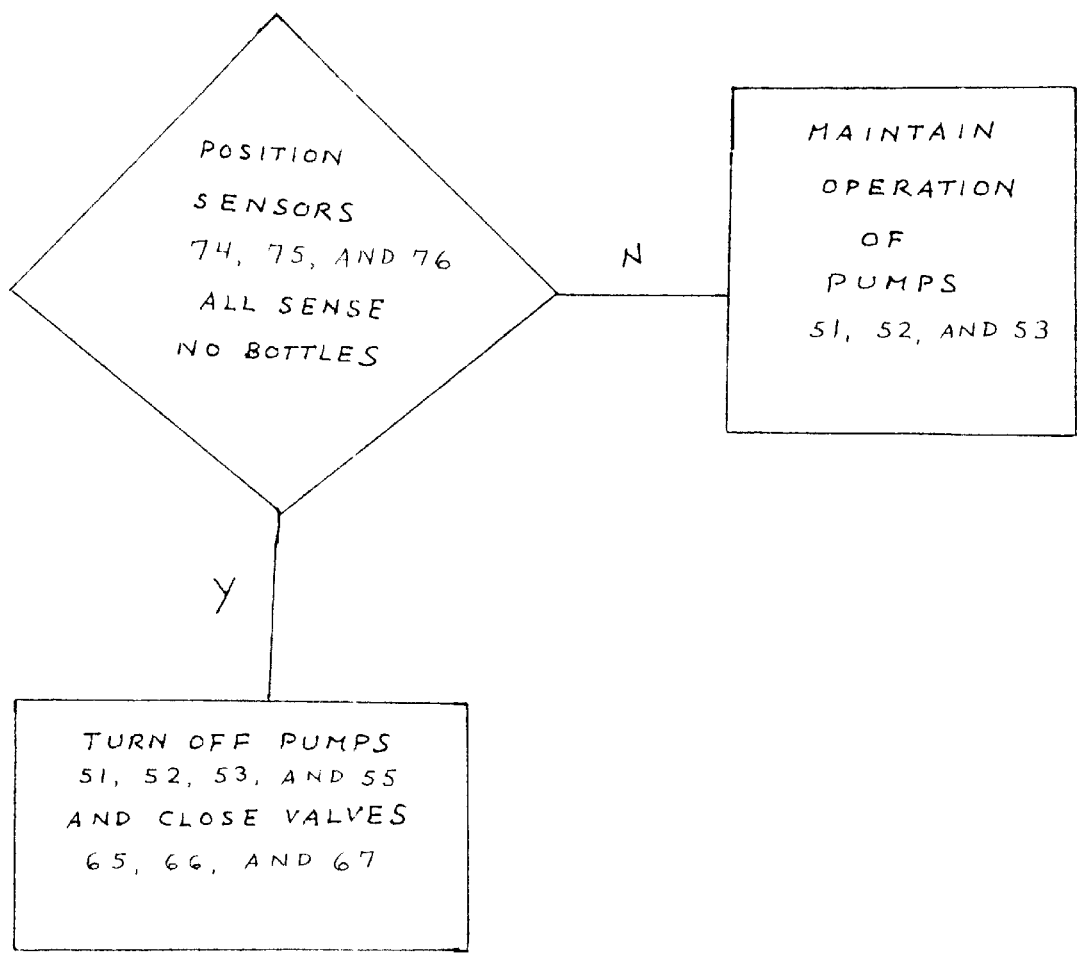

In FIG. 15, if position sensors 74, 75, and 76 all sense bottles, operation of pumps 51, 52, and 53 is maintained. If position sensors 74, 75, and 76 all sense no bottles, pumps 51, 52, 53, and 55 are turned off and valves 65, 66, and 67 are closed.

Figure 16:
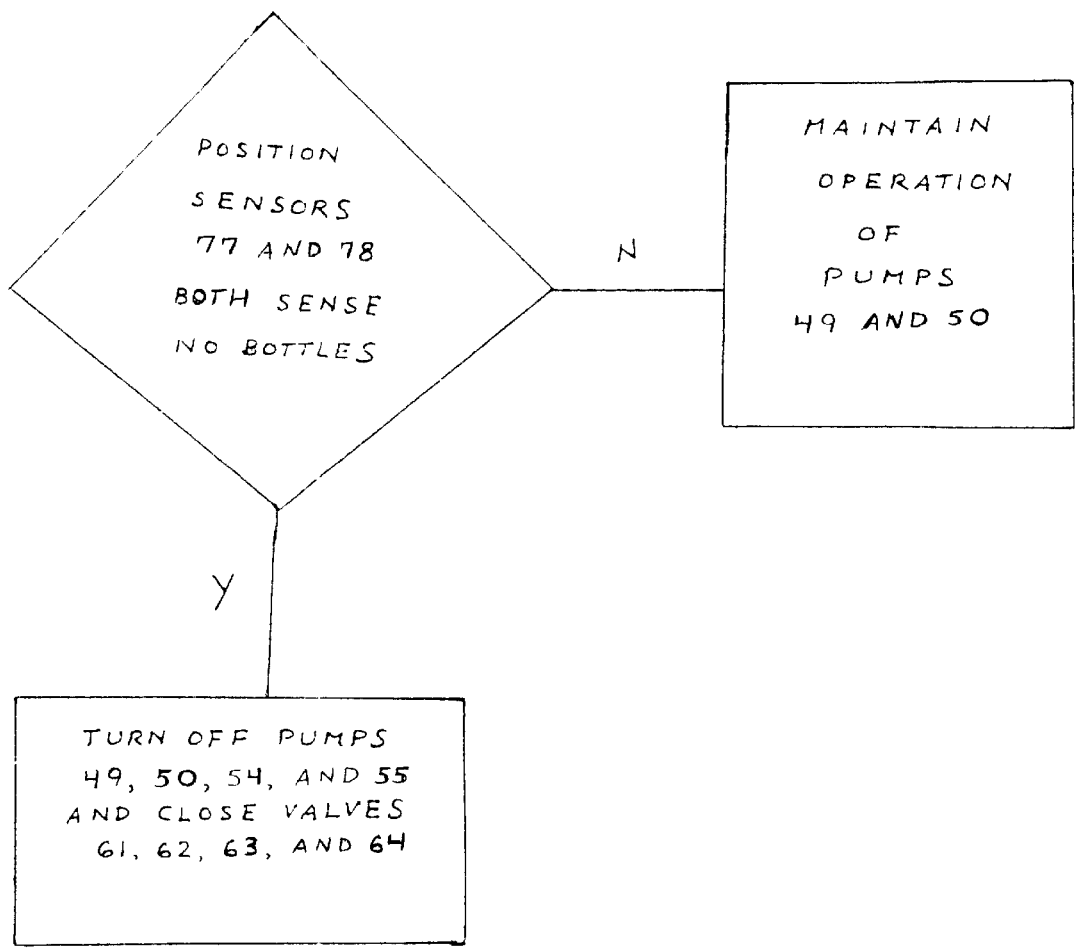

In FIG. 16, if position sensors 77 and 78 both sense bottles, operation of pumps 49 and 50 is maintained. If position sensors 77 and 78 both sense no bottles, pumps 49, 50, 54, and 55 are turned off and valves 61, 62, 63, and 64 are closed.

Figure 17:
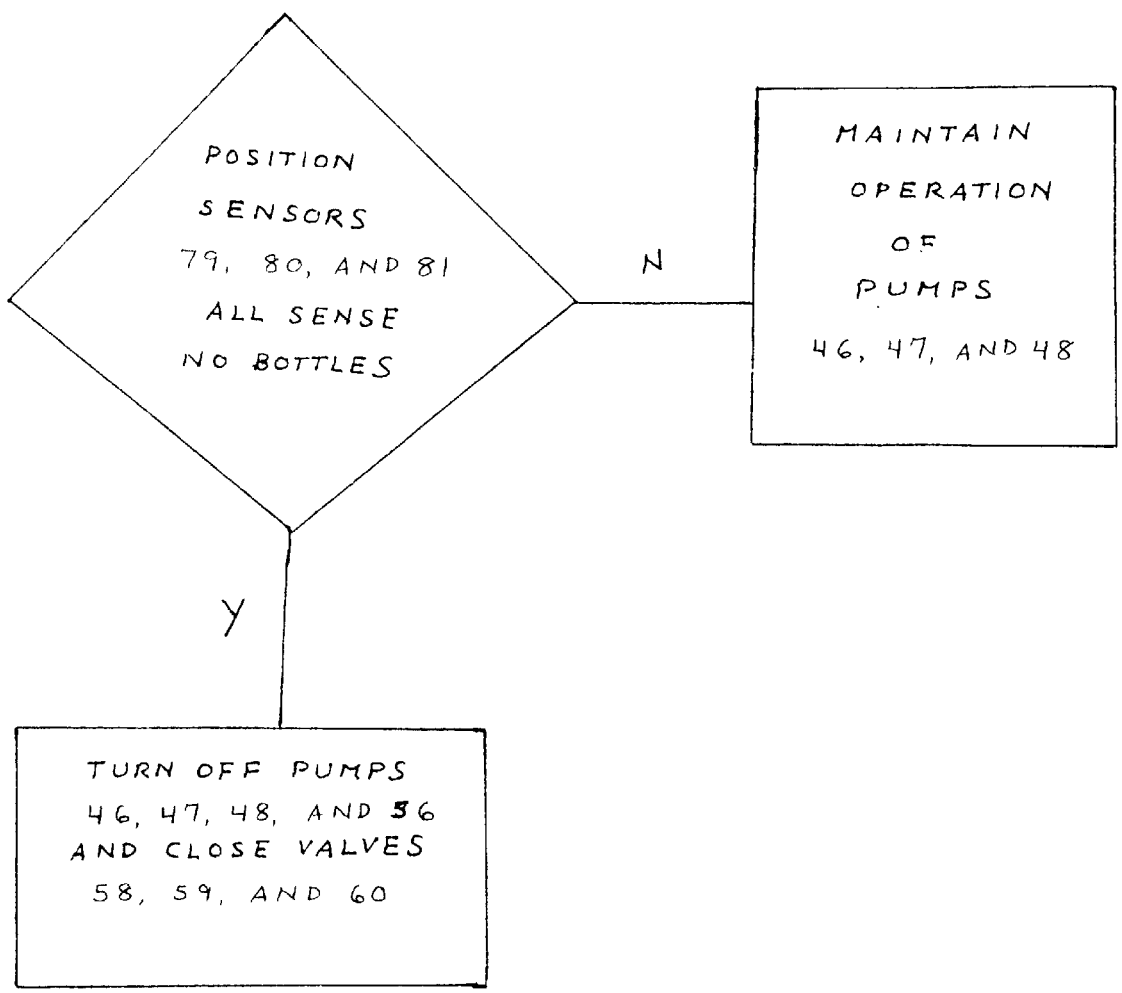

In FIG. 17, if position sensors 79, 80, and 81 all sense bottles, operation of pumps 46, 47, and 48 is maintained. If position sensors 79, 80, and 81 all sense no bottles, pumps 46, 47, 48, and 56 are turned off and valves 58, 59, and 60 are closed.

Figure 18:
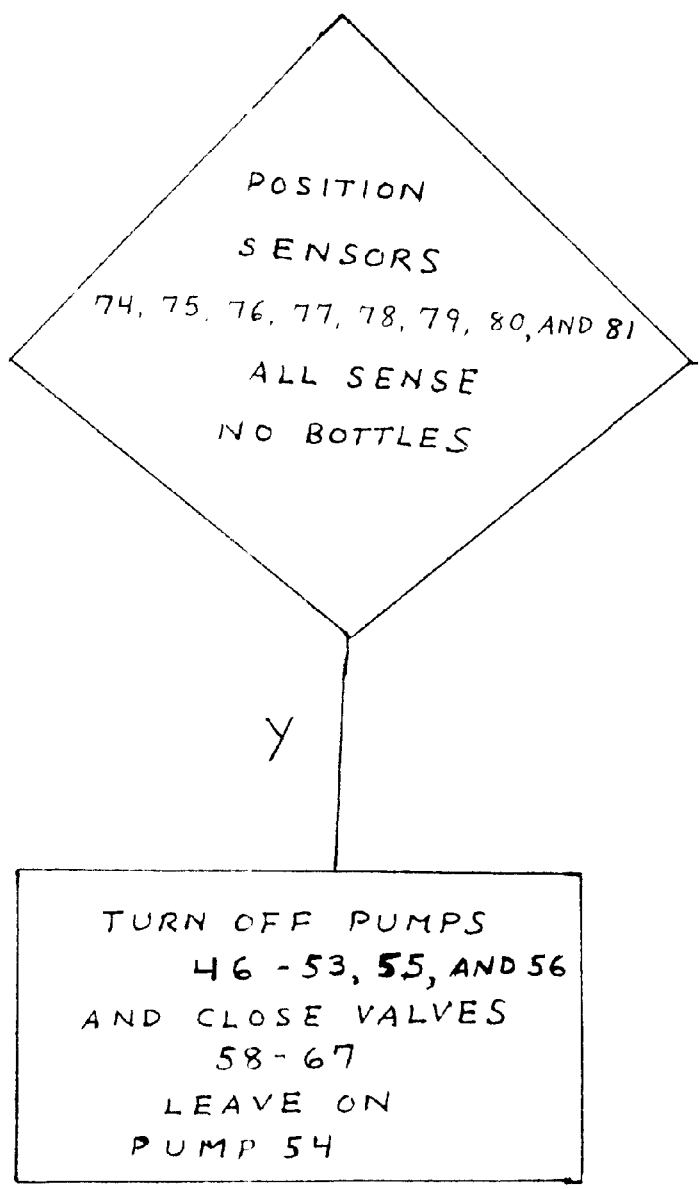

In FIG. 18, if position sensors 74, 75, 76, 77, 78, 79, 80, and 81 all sense no bottles, pumps 46–53, 55 and 56 are turned off and valves 58–67 are closed but pump 54 is left on.

A person skilled in computer art, for example, would be able to determine from this specification and the drawings for this application, with minimum experimentation or without undue experimentation, the operation of the pasteurization system, possibly including interruption, stoppage, or startup of the pasteurization system, as it relates to, for example, position sensors 77 and 78, sprayers 41 and 42, tanks 8, 9, 13, 15, and 16, liquid level sensors 27 and 29, temperature sensors 26 and 28, valves 61–64, overflow devices 69, 70, 72, and pumps 49, 50, 54, and 55.

Figure 19:
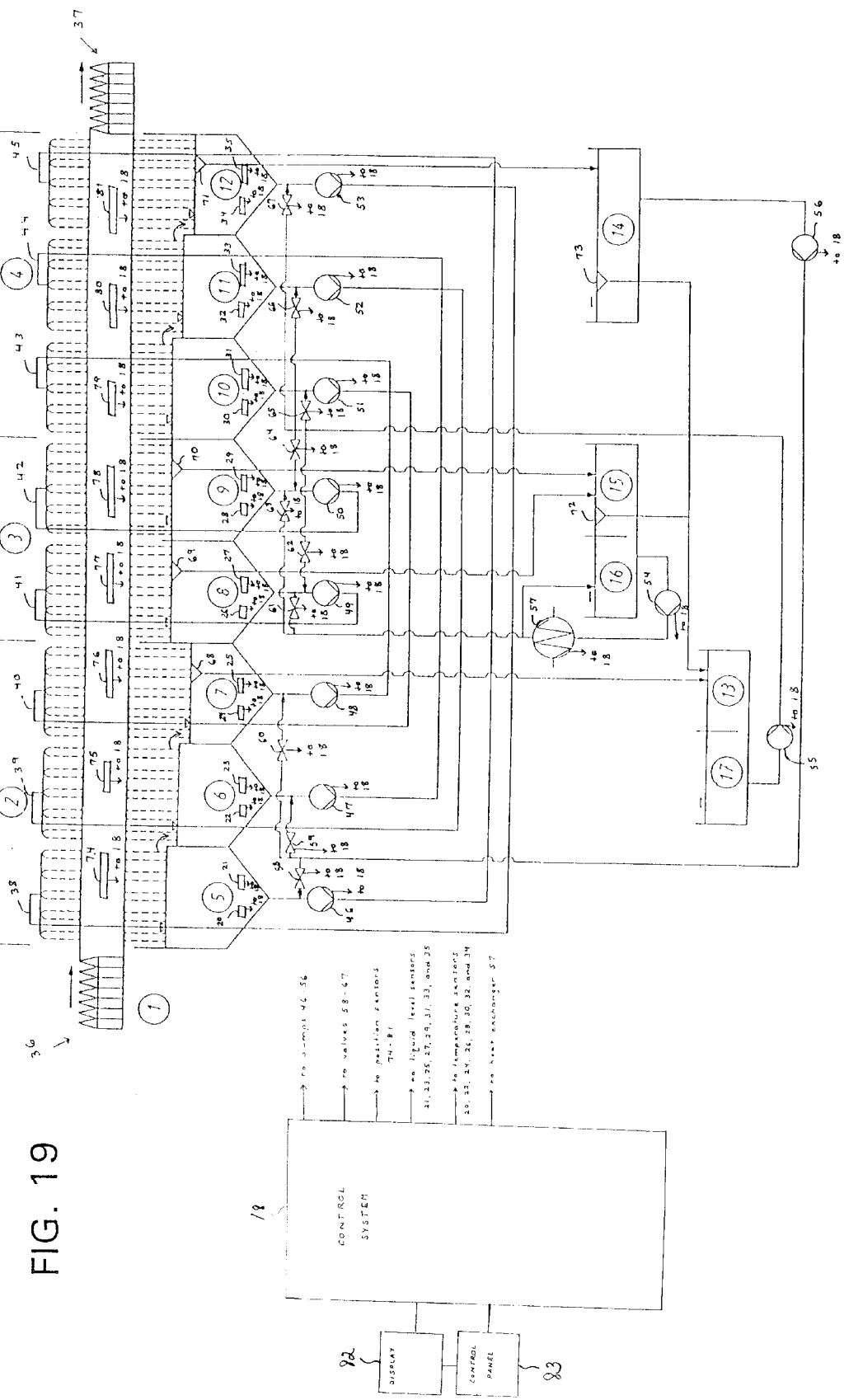
FIG. 19 is essentially identical to FIG. 2 except for the substitution of a manual control arrangement for the microprocessor shown in FIG. 2.
Figure 19A:
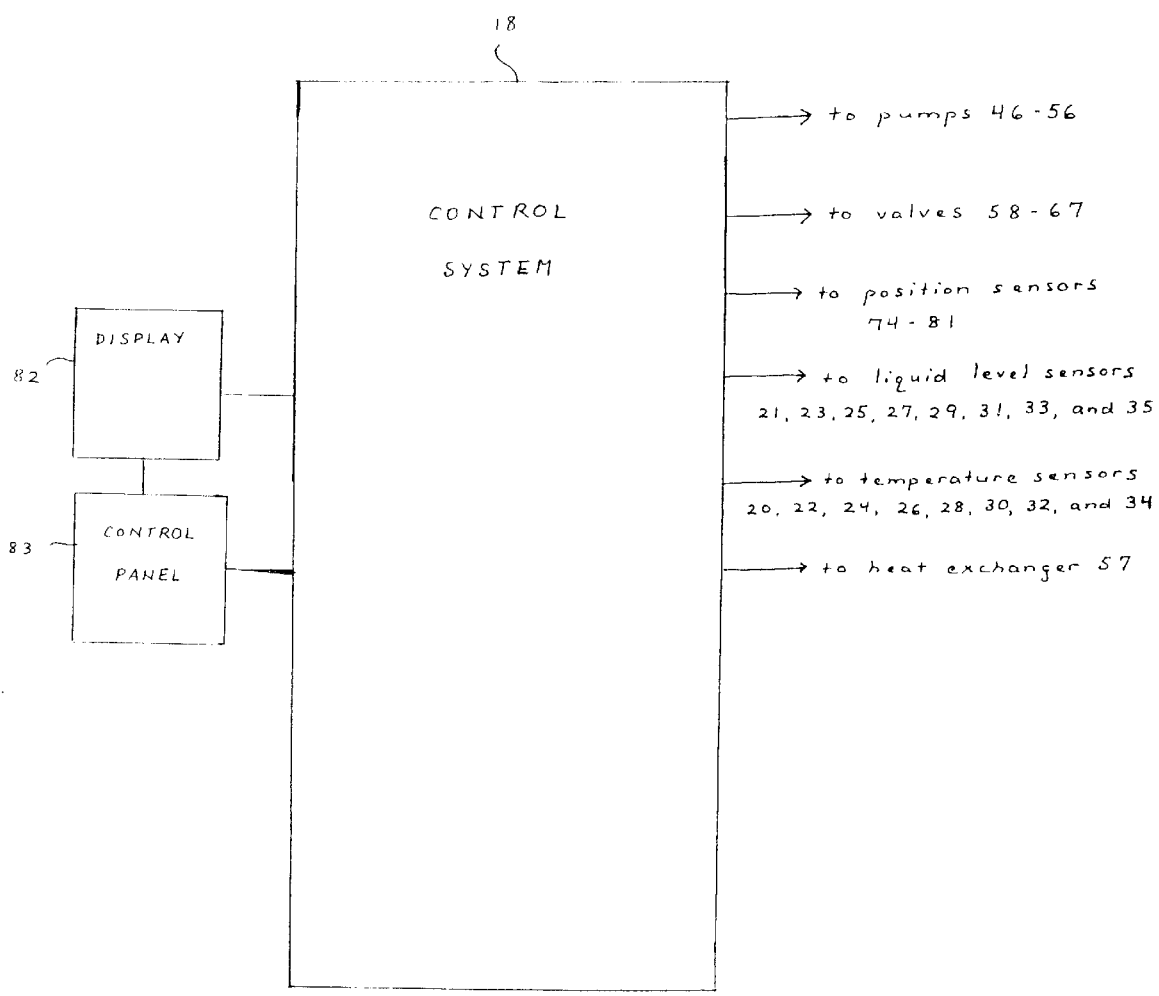
FIG. 19A is an enlarged view of the manual control arrangement shown in FIG. 19.

In at least one possible embodiment of the present invention, all or at least some of the components of the pasteurization system can be controlled manually by the control system 18, a display 82, and a control panel 83, which control system 18, display 82, and control panel 83 are shown in FIGS. 19 and 19A. In FIGS. 19 and 19A, both the display 82 and the control panel 83 are connected to the control system 18 and to each other. The control panel 83 may be operated by means of switches, and information relating to the control panel 83 is displayed on the display 82. The control system 18 in FIGS. 19 and 19A is connected to and controls pumps 46–56; valves 58–67; position sensors 74–81; liquid level sensors 21, 23, 25, 27, 29, 31, 33, and 35; temperature sensors 20, 22, 24, 26, 28, 30, 32, and 34; and the heat exchanger 57. A person skilled in the art would be able to determine, with minimum experimentation or without undue experimentation, manual operation of the pasteurization system and control arrangement shown in FIGS. 19 and 19A.

One or more of the words "stabilizing", "stable", "stabilization", "stabilize", "stabilized", "heat-stabilizing", "heat stabilizing", "heat stabilization", "heat-stable", "heat-stabilized", "heat-stabilize", and "high heating", as well as variants thereof, one or more of which words may be used in this application, may mean one or more of the words "pasteurizing", "pasteurization", "pasteurized", and "pasteurize", as well as variants thereof, and vice versa.

The present invention may relate to a method for the operation of a pasteurizing plant or facility for pasteurizing products in containers, as well as to an apparatus that is suitable for the performance of the method.

In the beverage industry, in particular when products being bottled are easily perishable, it is common practice to pasteurize the products. In pasteurizing plants of the known art, the containers that contain the products are transported in a practically uniform movement from the entry of the plant to the exit from the plant. As they move through the plant, they are heated until they have achieved the required degree of pasteurization and are then cooled, whereupon the pasteurizing process is completed. A pasteurizing tunnel provided for this purpose consequently has a heating section, a superheating and pasteurizing section, and a final cooling section. The individual sections can have additional sub-zones. The gradual heating and cooling that such an arrangement provides is preferred, in particular for the glass bottles used in the beverage industry, to prevent any destruction of the glass bottles caused by abrupt temperature changes. The transmission of heat to the product in the containers normally occurs by spraying these containers with water as they are advanced on a conveyor belt which allows the liquid to be sprayed from underneath. Underneath the conveyor belt are catch basins for the sprayed liquid from which the pumps for the spraying are fed. Heat can be exchanged by means of the spray liquid zone-wise between the zones to be heated and the zones to be cooled.

In at least one possible embodiment of the present invention, the containers to be pasteurized and the pasteurized containers preferably are bottles.

To achieve an optimal graduation of the temperatures in the individual sections, the sections are subdivided into individual zones. Generally, the heating section has three to four individual zones, the pasteurizing section has two or three zones, and there can be an additional superheating zone upstream of the pasteurizing zone. The following cooling section in turn has three to four individual zones, in which the containers are cooled by reducing the temperature of the spraying liquid in steps until the containers reach the desired output temperature.

To guarantee that the product in the containers achieves the specified degree of pasteurization, the individual spraying temperatures set must be adapted to the following factors, for example: the product, the length of the zones, and the speed of the conveyor belt.

Because such a pasteurization system may be installed as part of a more comprehensive bottling plant and may represent only a portion of this bottling plant, disruptions in the continuous feed of the containers, i.e., an interruption in the flow of containers, or disruptions in the removal of the containers, i.e., a production stoppage, can occur more or less frequently. The result of a production stoppage is that the taste of the products that are currently being held at the pasteurization temperature can be adversely affected by over-pasteurization.

If there is an interruption in the container flow or if the plant runs empty, the thermal equilibrium between the products being heated and the products being cooled is disrupted so that initially the products leave the plant at an excessive temperature, later the pasteurized products are no longer cooled quickly enough, and finally the products that enter the pasteurizing section are no longer at the required pasteurization temperature.

In other words, in known pasteurizing systems, if there is an interruption in the container flow or if the pasteurization or bottling plant runs empty, the thermal equilibrium between the products being heated and the products being cooled may be disrupted. As a result of such disruption, containers that enter the pasteurizing section may not be at the required pasteurization temperature. These containers may not be cooled quickly enough after pasteurization and therefore may leave the plant at an excessive temperature.

The consequences of the type of production disruption described above can be prevented by the controlled addition or removal of thermal energy. Generally, either heat is added to the process indirectly by means of heat exchangers or hot water is added directly from a central heat source and returned at a colder temperature. The removal of heat from the process is realized, as in the known art, by the addition of cold liquid, which is then removed at a higher temperature.

One possible object of the present invention may be to propose a method for the operation of such a pasteurizing plant in which the response to disruptions in the container flow can be managed in an essentially optimum fashion with an essentially minimized utilization of the resources water and heat.

One characteristic of the process may be that each addition of heat required for regulation of the process may be followed after some delay by the removal of heat (and vice versa) on the same order of magnitude. In this regard, the teachings concerning the storage of the heat are described in some publications.

One disadvantage of the methods described in some publications, however, is that as a result of the collection of the liquid overflowing from the plant in a conduit or in a plurality of reservoirs, a mixing of the temperatures takes place so that the resulting temperature of the fluid in the reservoir cannot be used either for controlled cooling or for controlled heating. An additional disadvantage is that although heat is stored on a low temperature level, the liquid in question cannot be used for cooling, i.e., there is no conservation of water.

At least one possible embodiment of the present invention teaches that to eliminate these disadvantages, the excess liquid in the heating section added by the regulation process to the zones in the method overflows in a cascade fashion from zone to zone of increasing overflow temperature; in the cooling section, overflows in cascade fashion from zone to zone of decreasing overflow temperature; from the last zone, i.e, the hottest zone in the heating section, overflows into an essentially warm liquid reservoir or tank 13; and from the coldest zone, position, or tank 10 in the cooling section, overflows into an essentially cold liquid reservoir or tank 14. Also, to eliminate the disadvantages of the known art, at least one possible embodiment of the present invention preferably teaches that the excess fluid added by the regulation process to the pasteurizing section overflows from the zones into an essentially hot liquid reservoir 15.

In an independent realization of the invention, the liquid contained in the cold liquid reservoir 14 can be forcibly transported and used in a controlled fashion to cool at least the zones or tanks in the cooling section and in the pasteurizing section; the liquid contained in the warm liquid reservoir 13 can be forcibly transported and used in a controlled fashion to heat at least the zones or tanks in the heating section or to cool the zones or tanks in the pasteurizing section; and the liquid in the hot liquid reservoir, after the addition of thermal energy, can be used in a controlled fashion to heat at least the zones or tanks in the pasteurizing section.

As a result of the use of at least one possible embodiment of the present invention, the cold water in the initial portion of the heating section may be essentially gradually heated to the respective higher operating temperatures of the subsequent zones, and the water injected into the cooling section is in turn cooled down essentially gradually, as a function of the individual zones, which may lead to a particularly efficient use of energy. Additionally, when there is a disruption in the feed of the containers to be pasteurized, the quantity of water currently in the containers can be used for an essentially rapid cooling of the critical zones, as well as for an essentially rapid heating of these zones and the additional zones, as a result of which the consumption of fresh water can be reduced significantly.

In other words, in at least one possible embodiment of the present invention, water or other liquid, even in the event of a stoppage, interruption, or emptying of the bottling plant or pasteurization system, preferably is recycled from the cooling section to the heating section, for example, and vice versa. Also, in at least one possible embodiment of the present invention, water or other liquid, even in the event of a stoppage, interruption, or emptying of the bottling plant or pasteurization system, is maintained at an essentially constant temperature by means of tanks or reservoirs that may be centrally located in the pasteurization system.

The present invention is explained in greater detail herein with reference to at least one exemplary embodiment, which is illustrated in the accompanying drawings as follows:

FIG. 1A is a block diagram of a beverage bottling plant and its sections;

FIG. 1 is a diagram of a pasteurizing plant;

FIG. 2 is an enlarged reproduction of FIG. 1 with additional information;

FIGS. 2A, 2B, 2C, 2D, 2E, and 2F are enlarged views of sections of FIG. 2;

FIG. 2G is an enlarged view of the control system and microprocessor shown in FIG. 2;

FIGS. 3–18 are flow charts for the operation of the pasteurizing system shown in FIGS. 2 and 2A–2G;

FIG. 19 is essentially identical to FIG. 2 except for the substitution of a manual control arrangement for the microprocessor shown in FIG. 2; and FIG. 19A is an enlarged view of the manual control arrangement shown in FIG. 19.

One feature of the invention resides broadly in the method for the pasteurization of products in containers in a continuous container flow 1 by stationary, sequential sections for heating 2, pasteurizing 3 and cooling 4 by means of overflowing liquid, whereby the sections are graduated with respect to one another in terms of their liquid temperature, and for purposes of efficient heat exchange, recovery, or recycling are organized in pairs, so that the liquid is transported by overflow from a heating zone to a cooling zone and the liquid overflowing from this cooling zone is transported to the heating zone, and to set the desired temperature of the overflowing liquid, warmer or cooler liquid is added to the liquid being transported, characterized by the fact that the excess liquid in the heating section 2 added by the temperature regulation process to the zones in the method overflows in a cascade fashion from zone to zone of increasing overflow temperature, and in the cooling section 4 overflows in cascade fashion from zone to zone of decreasing overflow temperature, and from the last zone, i.e the hottest zone 7 in the heating section overflows into a warm liquid reservoir 13, and from the coldest zone 10 in the cooling section into a cold liquid reservoir 14, and the excess fluid added by the regulation process to the pasteurizing section overflows from the zones into a hot liquid reservoir 15.

Another feature of the invention resides broadly in the method characterized by the fact that the liquid contained in the cold fluid reservoir 14 is used in a controlled fashion for cooling at least of the zones in the cooling section 4 and in the pasteurizing section 3, the fluid contained in the warm liquid reservoir 13 is used in a controlled fashion for the heating of at least the zones in the heating section 2 or for cooling of the zones in the pasteurizing section 3, and the liquid contained in the hot liquid reservoir 15, after the addition of thermal energy, can be used in a controlled fashion to heat at least the zones in the pasteurizing section 3.

Yet another feature of the invention resides broadly in the method characterized by the fact that the cold liquid reservoir 14 can overflow into the warm liquid reservoir 13.

Still another feature of the invention resides broadly in the method characterized by the fact that the hot liquid reservoir 15 can overflow into the warm liquid reservoir 13.

A further feature of the invention resides broadly in the method, characterized by the fact that the warm liquid reservoir 13 and the hot liquid reservoir 15 are divided in the direction of flow.

Another feature of the invention resides broadly in the method characterized by the fact that associated with the warm and hot liquid reservoirs 13, 15 are respective additional containers 16, 17 for the overflowing liquid.

Yet another feature of the invention resides broadly in the apparatus for the performance of the method described in the preceding claims, with a conveyor and a plurality of successive handling sections in a pasteurizing tunnel, characterized by the fact that the water of the heating zones 4–7 is conducted at least in part to the respective downstream zones of higher temperature, and no later than upstream of the superheating zone 8 is diverted into a first tank 13 of higher temperature, and the water of at least the superheating zone 8 and/or of the pasteurizing zone 9 can be fed to a second tank 15 of higher temperature, and this second tank 15 corresponds to an additional third tank 16 which is realized in the form of a hot water tank with a heating device, and there is a fourth tank 14 which is fed the water from the cooling zone 12, whereby this water can also be forcibly transported to the heating zone 5, and the water of the third tank 16 can be fed at least to the superheating and/or pasteurizing zone 8, 9.

Still another feature of the invention resides broadly in a method and an apparatus therefor for the pasteurization of products in containers in a continuous container flow by stationary, sequential sections for heating, pasteurizing, and cooling by means of overflowing liquid, whereby the sections are graduated with respect to one another in terms of their liquid temperature, and for purposes of efficient heat exchange are organized in pairs, so that the liquid is transported by overflow from a heating zone to a cooling zone and the liquid overflowing from this cooling zone is transported to the heating zone, and to set the desired temperature of the overflowing liquid, warmer or cooler liquid is added to the liquid being transported, characterized by the fact that the excess liquid in the heating section added by the temperature regulation process to the zones in the method overflows in a cascade fashion from zone to zone of increasing overflow temperature, and in the cooling section overflows in cascade fashion from zone to zone of decreasing overflow temperature, and from the hottest zone in the heating section overflows into a warm liquid reservoir, and from the coldest zone in the cooling section into a cold liquid reservoir, and the excess fluid added by the regulation process to the pasteurizing section overflows from the zones into a hot liquid reservoir.

Some examples of computer systems and methods and their components that may be used or adapted for use in at least one possible embodiment of the present invention may be found in U.S. Pat. No. 5,379,428, entitled "Hardware Process Scheduler and Processor Interrupter for Parallel Processing Computer Systems" and issued to Belo on Jan. 3, 1995; U.S. Pat. No. 5,398,333, entitled "Personal Computer Employing Reset Button to Enter ROM-based Diagnostics" and issued to Shieve et al. on Mar. 14, 1995; U.S. Pat. No. 5,390,301, entitled "Method and Apparatus for Communicating Device-Specific Information Between a Device Driver and an Operating System in a Computer System" and issued to Scherf on Feb. 14, 1995; U.S. Pat. No. 5,404,544, entitled "System for Periodically Transmitting Signal to/from Sleeping Node Identifying its Existence to a Network and Awakening the Sleeping Node Responding to Received Instruction" and issued to Crayford on Apr. 4, 1995; U.S. Pat. No. 5,418,942, entitled "System and Method for Storing and Managing Information" and issued to Krawchuk on May 23, 1995; U.S. Pat. No. 5,479,355, entitled "System and Method for a Closed Loop Operation of Schematic Designs with Electrical Hardware" and issued to Hyduke on Dec. 26, 1995; and U.S. Pat. No. 5,428,790, entitled "Computer Power Management System" and issued to Harper et al. on Jun. 27, 1995.

Some examples of switches or levers, or components thereof, that may be used or adapted for use in at least one possible embodiment of the present invention may be found in U.S. Pat. No. 5,392,895, entitled "Transfer Unit" and issued to Sorensen on Feb. 28, 1995; U.S. Pat. No. 5,404,992, entitled "Suspension Conveyor System" and issued to Robu et al. on Apr. 11, 1995; U.S. Pat. No. 5,438,911, entitled "Control Cylinder for Pneumatic Control Devices with Signal Switches" and issued to Fiedler et al. on Aug. 8, 1995; U.S. Pat. No. 5,440,289, entitled "Combined Alarm System and Window Covering Assembly" and issued to Riordan on Aug. 8, 1995; and U.S. Pat. No. 5,462,245, entitled "Apparatus for Locking Moveable Switch Parts" and issued to Durchschlag on Oct. 31, 1995.

Some examples of sensors and switches that may be used or adapted for use in at least one possible embodiment of the present invention may be found in U.S. Pat. No. 5,379,023, entitled "Alarm System" and issued to Dalton on Jan. 3, 1995; U.S. Pat. No. 5,453,589, entitled "Microswitch with Non-enlarging, Sealed Electrical Connections" and issued to Mayer on Sep. 26, 1995; U.S. Pat. No. 5,453,590, entitled "Bistable Microswitch" and issued to Mayer on Sep. 26, 1995; U.S. Pat. No. 5,378,865, entitled "Multi-directional Shock Sensor" and issued to Reneau on Jan. 3, 1995; U.S. Pat. No. 5,408,132, entitled "Proximity Switch Operating in a Non-Contacting Manner" and issued to Fericean et al. on Apr. 18, 1995; U.S. Pat. No. 5,428,253, entitled "Proximity Switch" and issued to Ogata et al. on Jun. 27, 1995; U.S. Pat. No. 5,442,150, entitled "Piezo Electric Switch" and issued to Ipcinski on Aug. 15, 1995; U.S. Pat. No. 5,430,421, entitled "Reed Contactor and Process of Fabricating Suspended Tridimensional Metallic Microstructure" and issued to et al. on Jul. 4, 1994; and U.S. Pat. No. 5,444,295, entitled "Linear Dual Switch Module" and issued to Lake et al. on Aug. 22, 1995.

Some examples of sensors, sensor systems, gauges, or gauge systems that may be used or adapted for use in at least one possible embodiment of the present invention may be found in the following U.S. patents: U.S. Pat. No. 6,016,697, issued to inventors McCulloch et al. on Jan. 25, 2000; U.S. Pat. No. 5,857,482, issued to inventor Dowling on Jan. 12, 1999; U.S. Pat. No. 5,785,100, issued to inventors Showalter et al. on Jul. 28, 1998; U.S. Pat. No. 5,699,049, issued to inventor Difiore on Dec. 16, 1997; U.S. Pat. No. 5,651,285, issued to inventor Legras on Jul. 29, 1997; U.S. Pat. No. 5,627,523, issued to inventors Besprozvanny et al. on May 6, 1997; U.S. Pat. No. 5,581,062, issued to inventor Gomez, Jr. on Dec. 3, 1996; U.S. Pat. No. 5,105,668, issued to inventors Ficken et al. on Apr. 21, 1992; U.S. Pat. No. 5,056,363, issued to inventors Arekapudi et al. on Oct. 15, 1991; U.S. Pat. No. 5,054,319, issued to inventor Fling on Oct. 8, 1991; U.S. Pat. No. 4,962,395, issued to inventor Baird on Oct. 9, 1990; U.S. Pat. No. 4,935,727, issued to inventors Re Fiorentin et al. on Jun. 19, 1990; U.S. Pat. No. 4,917,173, issued to inventors Brown et al. on Apr. 17, 1990; U.S. Pat. No. 4,838,303, issued to inventor Goans on Jun. 13, 1989; U.S. Pat. No. 4,825,695, issued to inventor Ohtani on May 2, 1989; U.S. Pat. No. 4,777,821, issued to inventor Gerve on Oct. 18, 1988; U.S. Pat. No. 4,715,398, issued to inventors Shouldice et al. on Dec. 29, 1987; U.S. Pat. No. 4,497,205, issued to inventors Zulauf et al. on Feb. 5, 1985; U.S. Pat. No. 4,467,156, issued to inventors Dvorak et al. on Aug. 21, 1984; U.S. Pat. No. 4,383,544, issued to inventor Vosper on May 17, 1983; U.S. Pat. No. 4,379,434, issued to inventor Thordarson on Apr. 12, 1983; U.S. Pat. No. 4,205,237, issued to inventor Miller on May 27, 1980; U.S. Pat. No. 4,194,395, issued to inventor Wood on Mar. 25, 1980; U.S. Pat. No. 4,171,932, issued to inventor Miller on Oct. 23, 1979; U.S. Pat. No. 4,087,012, issued to inventor Fogg on May 2, 1978; and U.S. Pat. No. 4,021,122, issued to inventor Krenmayr on May 3, 1977.

Some examples of temperature sensors or sensor systems that may be used or adapted for use in at least one possible embodiment of the present invention may be found in the following U.S. patents: U.S. Pat. No. 5,960,857, issued to inventors Oswalt et al. on Oct. 5, 1999; U.S. Pat. No. 5,942,980, issued to inventors Hoben et al. on Aug. 24, 1999; U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No.

5,078,123, issued to inventors Nagashima et al. on Jan. 7, 1992; and U.S. Pat. No. 5,068,030, issued to inventor Chen on Nov. 26, 1991.

Some examples of position sensors or position sensor systems that may be used or adapted for use in at least one possible embodiment of the present invention may be found in the following U.S. patents: U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of heaters or heat exchangers, cooling systems, valves, pumps, or tanks that may be used or adapted for use in at least one possible embodiment of the present invention may be found in the following U.S. patents: U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

Some examples of conveyor belts or conveyor arrangements and components thereof that may be used or adapted for use in at least one possible embodiment of the present invention may be found in the following U.S. patents: U.S. Pat. No. 5,999,099, issued to inventor Stobbe on Dec. 7, 1999; U.S. Pat. No. 5,960,933, issued to inventor Albrecht on Oct. 5, 1999; U.S. Pat. No. 5,881,429, issued to inventor Drewitz on Mar. 16, 1999; U.S. Pat. No. 5,873,946, issued to inventor Hantmann on Feb. 23, 1999; U.S. Pat. No. 5,520,290, issued to inventors Kumar et al. on May 28, 1996; U.S. Pat. No. 5,429,651, issued to inventor Bolin on Jul. 4, 1995; U.S. Pat. No. 5,411,129, issued to inventor Crouch on May 2, 1995; U.S. Pat. No. 5,293,888, issued to inventors Avelis et al. on Mar. 15, 1994; U.S. Pat. No. 5,107,980, issued to inventor Piazza on Apr. 28, 1992; and U.S. Pat. No. 5,038,917, issued to inventor Kronseder on Aug. 13, 1991.

The components disclosed in the various publications disclosed or incorporated by reference herein, may be used in the embodiments of the present invention, as well as equivalents thereof.

The appended drawings in their entirety, including all dimensions, proportions, and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 199 080 35.6, filed on Feb. 24, 1999, having inventors Gisbert Strohn, Ulrich Wiedemann, Bernd Molitor and Falk Dittrich, and DE-OS P 199 080 35.6 and DE-PS P 199 080 35.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A bottling plant for bottling beverages, said bottling plant comprising:
   a bottle rinsing section for rinsing bottles;
   a bottle filling section to receive bottles for spraying and to fill bottles with liquid;
   a bottle capping section for capping bottles;
   a bottle stabilizing section for stabilizing bottles, said bottle stabilizing section comprising:
      a plurality of spray arrangements, each of said plurality of spray arrangements being configured and disposed to spray liquid over at least one bottle;
      a plurality of tanks, said plurality of tanks being disposed to capture liquid from said plurality of spray arrangements;
      at least three tank arrangements configured to receive liquid from said plurality of tanks and to supply liquid to said plurality of tanks;
      an arrangement interconnecting said plurality of spray arrangements, said plurality of tanks, and said at least three tank arrangements among one another to adjust characteristics, temperature, and flow of liquid circulating in said bottle stabilizing section in response to interruptions of movement of bottles in said bottle stabilizing section;
   a control system for controlling said bottle stabilizing section;
   said plurality of spray arrangements comprise at least a first spray arrangement, a second spray arrangement, and a third spray arrangement;
   said interconnecting arrangement further comprises:
      at least one pump arrangement for recycling liquid in said plurality of tanks from at least said first spray arrangement to at least said second spray arrangement and from at least said second spray arrangement to at least said first spray arrangement; and
      an arrangement to configure and dispose each of said plurality of tanks to supply said plurality of spray arrangements with liquid;

a conveyance arrangement for moving bottles;

at least one pump, said at least one pump being configured to supply liquid to at least one of said first, second, and third spray arrangements;

at least one valve, said at least one valve being configured to regulate liquid flow into at least one of said first, second, and third spray arrangements;

said at least three tank arrangements comprise a first tank arrangement, a second tank arrangement, and a third tank arrangement;

each of said first tank arrangement, said second tank arrangement, and said third tank arrangement is configured to hold liquid;

said interconnecting arrangement further comprises:
a heat exchanger, said heat exchanger being configured to regulate liquid temperature in at least one of said at least three tank arrangements;
an arrangement to dispose said plurality of tanks generally below said conveyance arrangement;
an arrangement to configure and dispose each of said plurality of tanks to provide liquid to bottles;
an arrangement to configure and dispose said conveyance arrangement to move bottles generally above said plurality of tanks;
an arrangement to dispose each of said at least three spray arrangements generally above at least one of said plurality of tanks;
an arrangement to configure and dispose each of said plurality of tanks to supply, using said at least one pump and said at least one valve, liquid to at least one of said plurality of spray arrangements;
an arrangement to configure and dispose said at least three tank arrangements to maintain predetermined liquid temperature in at least each of said first, second, and third spray arrangements; and
an arrangement to configure and dispose said at least three tank arrangements to supply liquid in said at least three tank arrangements to at least one of said plurality of tanks, said at least one valve, said at least one pump, and at least said first, second, and third spray arrangements in the event of an interruption in movement of bottles along said conveyance arrangement;

an overflow apparatus, said overflow apparatus being disposed generally at said second tank arrangement; and an arrangement to configure and dispose said overflow apparatus to permit overflow of liquid from said second tank arrangement into said first tank arrangement to increase liquid temperature in said first tank arrangement.

2. A bottling plant for bottling beverages, said bottling plant comprising:

a bottle rinsing section for rinsing bottles;

a bottle filling section to receive bottles for spraying and to fill bottles with liquid;

a bottle capping section for capping bottles;

a bottle stabilizing section for stabilizing bottles, said bottle stabilizing section comprising:
a plurality of spray arrangements, each of said plurality of spray arrangements being configured and disposed to spray liquid over at least one bottle;
a plurality of tanks, said plurality of tanks being disposed to capture liquid from said plurality of spray arrangements;
at least three tank arrangements configured to receive liquid from said plurality of tanks and to supply liquid to said plurality of tanks;
an arrangement interconnecting said plurality of spray arrangements, said plurality of tanks, and said at least three tank arrangements among one another to adjust characteristics, temperature, and flow of liquid circulating in said bottle stabilizing section in response to interruptions of movement of bottles in said bottle stabilizing section;

a control system for controlling said bottle stabilizing section;

said plurality of spray arrangements comprise at least a first spray arrangement, a second spray arrangement, and a third spray arrangement;

said interconnecting arrangement further comprises:
at least one pump arrangement for recycling liquid in said plurality of tanks from at least said first spray arrangement to at least said second spray arrangement and from at least said second spray arrangement to at least said first spray arrangement; and
an arrangement to configure and dispose each of said plurality of tanks to supply said plurality of spray arrangements with liquid;

a conveyance arrangement for moving bottles;

at least one pump, said at least one pump being configured to supply liquid to at least one of said first, second, and third spray arrangements;

at least one valve, said at least one valve being configured to regulate liquid flow into at least one of said first, second, and third spray arrangements;

said at least three tank arrangements comprise a first tank arrangement, a second tank arrangement, and a third tank arrangement;

each of said first tank arrangement, said second tank arrangement, and said third tank arrangement is configured to hold liquid;

said interconnecting arrangement further comprises:
a heat exchanger, said heat exchanger being configured to regulate liquid temperature in at least one of said at least three tank arrangements;
an arrangement to dispose said plurality of tanks generally below said conveyance arrangement;
an arrangement to configure and dispose each of said plurality of tanks to provide liquid to bottles;
an arrangement to configure and dispose said conveyance arrangement to move bottles generally above said plurality of tanks;
an arrangement to dispose each of said at least three spray arrangements generally above at least one of said plurality of tanks;
an arrangement to configure and dispose each of said plurality of tanks to supply, using said at least one pump and said at least one valve, liquid to at least one of said plurality of spray arrangements;
an arrangement to configure and dispose said at least three tank arrangements to maintain predetermined liquid temperature in at least each of said first, second, and third spray arrangements; and
an arrangement to configure and dispose said at least three tank arrangements to supply liquid in said at least three tank arrangements to at least one of said plurality of tanks, said at least one valve, said at least one pump, and at least said first, second, and third spray arrangements in the event of an interruption in movement of bottles along said conveyance arrangement;

an overflow apparatus, said overflow apparatus being disposed generally at said second tank arrangement;

an overflow arrangement, said overflow arrangement being disposed generally at said third tank arrangement;

an arrangement to configure and dispose said overflow apparatus to permit overflow of liquid from said second tank arrangement into said first tank arrangement to increase liquid temperature in said first tank arrangement; and an arrangement to configure and dispose said overflow arrangement to permit overflow of liquid from said third tank arrangement into said first tank arrangement to lower liquid temperature in said first tank arrangement.

3. The bottling plant according to claim 2, wherein said bottle stabilizing section further comprises:

at least three position sensors for sensing a position of at least one bottle;

each of said at least three position sensors is located generally at at least one of said plurality of tanks;

said at least three position sensors are configured to sense a position of at least one bottle generally below at least one of said at least three spray arrangements;

said at least three tank arrangements further comprise:
  a fourth tank arrangement, said fourth tank arrangement being configured to hold liquid at a predetermined temperature; and
  a fifth tank arrangement, said fifth tank arrangement being configured to hold liquid at a predetermined temperature;

the predetermined temperature of liquid in said fourth tank arrangement is higher than the predetermined temperature of liquid in each of said first tank arrangement and said fourth tank arrangement;

the predetermined temperature of liquid in said third tank arrangement is lower than the predetermined temperature of liquid in each of said first tank arrangement, said second tank arrangement, said third tank arrangement, and said fourth tank arrangement;

said plurality of tanks comprise at least three tanks; and said interconnecting arrangement further comprises:
  an arrangement to configure and dispose said tank arrangements to maintain predetermined temperature of liquid in each of said plurality of spray arrangements;
  an arrangement to configure and dispose said tank arrangements to supply liquid in said tank arrangements to at least one of said at least three tanks, said at least one valve, said at least one pump, and at least said first, second, and third spray arrangements in the event of an interruption in movement of bottles along said conveyance arrangement; and
  an arrangement to configure and dispose said heat exchanger to regulate liquid temperature in at least one of said tank arrangements.

4. The bottling plant according to claim 3, wherein;

said control system further comprises a microprocessor for controlling said control system; and said bottle stabilizing section further comprises:
  said at least three tanks comprise at least eight tanks;
  said at least three spray arrangements comprise at least eight spray arrangements; and
  said at least three position sensors comprise at least eight position sensors.

5. A container stabilizing section for stabilizing liquid in containers in a plant for filling containers, said plant for filling containers comprising:

a pasteurizing section for pasteurizing containers;

a container rinsing section for rinsing containers;

a container filling section to receive containers for spraying and to fill containers with liquid;

a container sealing section for sealing containers;

said container stabilizing section comprising:
  a plurality of spray arrangements;
  a plurality of tanks; and
  an interconnecting arrangement to interconnect said plurality of spray arrangements and said plurality of tanks among one another to adjust temperature and flow of liquid circulating in said container stabilizing section in response to interruptions of movement of containers in said container stabilizing section;

said interconnecting arrangement further comprises an arrangement to configure and dispose each of said plurality of tanks to supply said plurality of spray arrangements with liquid;

said interconnecting arrangement is configured and disposed to maintain temperature of containers at predetermined temperatures at predetermined locations in said container stabilizing section during interruptions of movement of containers in said container stabilizing section;

a conveyance arrangement for moving containers;

at least one pump, said at least one pump being configured to supply liquid to at least one of said plurality of spray arrangements;

at least one valve, said at least one valve being configured to regulate liquid flow into at least one of said plurality of spray arrangements;

a plurality of tank arrangements configured to receive liquid from said plurality of tanks and to supply liquid to said plurality of tanks;

said interconnecting arrangement further comprises:
  an arrangement to dispose said plurality of tanks generally below said conveyance arrangement;
  an arrangement to configure and dispose each of said plurality of tanks to provide liquid to containers;
  an arrangement to configure and dispose said conveyance arrangement to move containers generally above said plurality of tanks;
  an arrangement to dispose each of said plurality of spray arrangements generally above at least one of said plurality of tanks;
  an arrangement to configure and dispose each of said plurality of tanks to supply, using said at least one pump and said at least one valve, liquid to at least one of said plurality of spray arrangements;
  an arrangement to configure and dispose said plurality of tank arrangements to maintain predetermined liquid temperature in each of said plurality of spray arrangements;
  an arrangement to configure and dispose said plurality of tank arrangements to supply liquid in said plurality of tank arrangements to at least one of said plurality of tanks, said at least one valve, said at least one pump, and said plurality of spray arrangements in the event of an interruption in movement of containers along said conveyance arrangement;

said plurality of tank arrangements comprise a first tank arrangement, a second tank arrangement, and a third tank arrangement;

each of said first tank arrangement, said second tank arrangement, and said third tank arrangement is configured to hold liquid;

said interconnecting arrangement further comprises:
  a first overflow arrangement, said first overflow arrangement being disposed generally at said second tank arrangement;
  a second overflow arrangement, said second overflow arrangement being disposed generally at said third tank arrangement;
  an arrangement to configure and dispose said first overflow arrangement to permit overflow of liquid from said second tank arrangement into said first tank arrangement to increase liquid temperature in said first tank arrangement; and
  an arrangement to configure and dispose said second overflow arrangement to permit overflow of liquid from said third tank arrangement into said first tank arrangement to lower liquid temperature in said first tank arrangement.

6. The container stabilizing section according to claim 5, wherein said container stabilizing section further comprises: each of said plurality of spray arrangements is configured and disposed to spray liquid at a predetermined temperature;

said interconnecting arrangement further comprises:
  a heat exchanger, said heat exchanger being configured to regulate liquid temperature in at least one of said plurality of tank arrangements;
  an arrangement to configure and dispose said plurality of tank arrangements to maintain predetermined temperature of liquid in each of said plurality of spray arrangements;
  an arrangement to configure and dispose said tank arrangements to supply liquid in said tank arrangements to at least one of said plurality of tanks, said at least one valve, said at least one pump, and said plurality of spray arrangements in the event of an interruption in movement of containers along said conveyance arrangement; and
  an arrangement to configure and dispose said heat exchanger to regulate liquid temperature in at least one of said plurality of tank arrangements.

* * * * *